US009224039B2

(12) United States Patent
Esposito et al.

(10) Patent No.: US 9,224,039 B2
(45) Date of Patent: Dec. 29, 2015

(54) CONTEXTUALIZATION OF MACHINE INDETERMINABLE INFORMATION BASED ON MACHINE DETERMINABLE INFORMATION

(71) Applicant: DST Technologies, Inc., Kansas City, MO (US)

(72) Inventors: Deni Esposito, Richmond Hill (CA); Paul M. Ives, Toronto (CA); Peter E. Clark, Oakville (CA); Michael V. Gentry, Toronto (CA)

(73) Assignee: DST Technologies, Inc., Kansas City, MO (US)

( * ) Notice: Subject to any disclaimer, the term of this patent is extended or adjusted under 35 U.S.C. 154(b) by 167 days.

(21) Appl. No.: 14/070,196

(22) Filed: Nov. 1, 2013

(65) Prior Publication Data
US 2014/0056469 A1 Feb. 27, 2014

Related U.S. Application Data

(60) Division of application No. 12/859,328, filed on Aug. 19, 2010, now Pat. No. 8,600,173, which is a continuation-in-part of application No. 12/695,009, filed on Jan. 27, 2010, now Pat. No. 8,824,785.

(51) Int. Cl.
*G06K 9/00* (2006.01)
*G06K 9/03* (2006.01)
*G06F 3/0488* (2013.01)

(52) U.S. Cl.
CPC ........ *G06K 9/00456* (2013.01); *G06F 3/04886* (2013.01); *G06K 9/00442* (2013.01); *G06K 9/033* (2013.01)

(58) Field of Classification Search
None
See application file for complete search history.

(56) References Cited

U.S. PATENT DOCUMENTS

| | | |
|---|---|---|
| 4,058,795 A | 11/1977 | Balm |
| 4,610,025 A | 9/1986 | Blum et al. |
| 4,992,649 A | 2/1991 | Mampe et al. |
| 5,181,255 A | 1/1993 | Bloomberg |
| 5,191,525 A | 3/1993 | LeBrun et al. |

(Continued)

OTHER PUBLICATIONS

Andreev, Andrey and Kirov, Nikolay, "Some Variants of Hausdorff Distance for Word Matching," Institute of Mathematics and Informatics, Bulgarian Academy of Sciences, 2008, pp. 3-8.

(Continued)

*Primary Examiner* — Aaron W Carter
(74) *Attorney, Agent, or Firm* — Lempia Summerfield Katz LLC

(57) ABSTRACT

A system for contextualizing machine indeterminable information based on machine determinable information may include a memory, an interface, and a processor. The memory may store an electronic document image which may include information determinable by a machine and information indeterminable by a machine. The processor may be operative to receive, via the interface, the electronic document image. The processor may determine the machine determinable information of the electronic document image and may identify the machine indeterminable information of the electronic document image. The processor may contextualize the machine indeterminable information based on the machine determinable information. The processor may present the contextualized machine indeterminable information to the user to facilitate interpretation thereof. In response thereto, the processor may receive, via the interface, data representative of a user determination associated with the machine indeterminable information.

14 Claims, 20 Drawing Sheets

(56) References Cited

U.S. PATENT DOCUMENTS

| | | | |
|---|---|---|---|
| 5,258,855 A | 11/1993 | Lech et al. | |
| 5,369,508 A | 11/1994 | Lech et al. | |
| 5,442,781 A | 8/1995 | Yamagata | |
| 5,552,901 A | 9/1996 | Kikuchi et al. | |
| 5,587,809 A | 12/1996 | Le Corre et al. | |
| 5,625,465 A | 4/1997 | Lech et al. | |
| 5,631,984 A | 5/1997 | Graf et al. | |
| 5,768,416 A | 6/1998 | Lech et al. | |
| 5,850,480 A | 12/1998 | Scanlon | |
| 6,044,375 A | 3/2000 | Shmueli et al. | |
| 6,094,505 A | 7/2000 | Lech et al. | |
| 6,397,261 B1 | 5/2002 | Eldridge et al. | |
| 6,442,555 B1 | 8/2002 | Shmueli et al. | |
| 6,510,992 B2 | 1/2003 | Wells et al. | |
| 6,529,956 B1 | 3/2003 | Smith et al. | |
| 6,553,365 B1 | 4/2003 | Summerlin et al. | |
| 6,610,955 B2 | 8/2003 | Lopez | |
| 6,683,697 B1 | 1/2004 | Lech et al. | |
| 6,697,703 B2 | 2/2004 | Lopez | |
| 6,819,777 B2 | 11/2004 | Baker et al. | |
| 6,820,237 B1 * | 11/2004 | Abu-Hakima | G06F 17/218 715/210 |
| 6,909,805 B2 | 6/2005 | Ma et al. | |
| 6,940,617 B2 | 9/2005 | Ma et al. | |
| 7,072,514 B1 | 7/2006 | Thouin | |
| 7,075,673 B2 | 7/2006 | Lech et al. | |
| 7,146,367 B2 | 12/2006 | Shutt | |
| 7,149,347 B1 * | 12/2006 | Wnek | G06K 9/00469 382/159 |
| 7,162,635 B2 | 1/2007 | Bisbee et al. | |
| 7,184,162 B2 | 2/2007 | Lech et al. | |
| 7,259,887 B2 | 8/2007 | Lech et al. | |
| 7,283,270 B2 | 10/2007 | Boire-Lavigne et al. | |
| 7,474,434 B2 | 1/2009 | Lech et al. | |
| 7,478,088 B2 | 1/2009 | Summerlin et al. | |
| 7,561,734 B1 * | 7/2009 | Wnek | G06F 17/243 382/159 |
| 7,570,383 B2 | 8/2009 | Lech et al. | |
| 7,619,768 B2 | 11/2009 | Lech et al. | |
| 7,672,007 B2 | 3/2010 | Lech et al. | |
| 7,930,322 B2 | 4/2011 | MacLennan | |
| 8,135,710 B2 | 3/2012 | Summerlin et al. | |
| 8,600,173 B2 * | 12/2013 | Esposito | G06K 9/00442 382/224 |
| 8,824,785 B2 * | 9/2014 | Ives | G06K 9/00442 382/164 |
| 8,948,535 B2 * | 2/2015 | Ives | G06K 9/00442 382/260 |
| 2003/0145212 A1 | 7/2003 | Crumly | |
| 2003/0182304 A1 | 9/2003 | Summerlin et al. | |
| 2003/0217034 A1 | 11/2003 | Shutt | |
| 2004/0158733 A1 | 8/2004 | Bouchard | |
| 2004/0240735 A1 | 12/2004 | Medina | |
| 2004/0267722 A1 * | 12/2004 | Larimore | G06F 17/30622 |
| 2005/0146508 A1 | 7/2005 | Kirkland et al. | |
| 2005/0192924 A1 | 9/2005 | Drucker et al. | |
| 2005/0234968 A1 * | 10/2005 | Arumainayagam | G06F 17/30011 |
| 2006/0238822 A1 | 10/2006 | Van Hoof | |
| 2007/0022372 A1 | 1/2007 | Liu et al. | |
| 2007/0094282 A1 * | 4/2007 | Bent | G06F 17/278 |
| 2008/0002224 A1 | 1/2008 | Tanimoto | |
| 2008/0019519 A1 | 1/2008 | Su et al. | |
| 2008/0062472 A1 | 3/2008 | Garg et al. | |
| 2008/0077859 A1 | 3/2008 | Schabes et al. | |
| 2008/0133940 A1 | 6/2008 | Laurie et al. | |
| 2008/0144121 A1 | 6/2008 | Malatesta | |
| 2008/0172598 A1 * | 7/2008 | Jacobsen | G06F 17/243 715/224 |
| 2008/0256061 A1 | 10/2008 | Chang et al. | |
| 2009/0089305 A1 | 4/2009 | Summerlin et al. | |
| 2009/0300043 A1 | 12/2009 | MacLennan | |
| 2010/0005386 A1 * | 1/2010 | Verma | G06F 17/274 715/237 |
| 2010/0067067 A1 | 3/2010 | Lech et al. | |
| 2010/0180198 A1 | 7/2010 | Iakobashvili et al. | |
| 2010/0329537 A1 | 12/2010 | Gardi | |
| 2011/0125735 A1 * | 5/2011 | Petrou | G06F 17/30277 707/723 |
| 2011/0182500 A1 | 7/2011 | Esposito et al. | |
| 2011/0213491 A1 | 9/2011 | Rundle, Jr. et al. | |
| 2011/0280481 A1 | 11/2011 | Radakovic et al. | |
| 2011/0320378 A1 | 12/2011 | Shutt | |
| 2012/0134590 A1 * | 5/2012 | Petrou | G06F 17/30253 382/182 |
| 2012/0143868 A1 | 6/2012 | Summerlin et al. | |
| 2012/0215791 A1 | 8/2012 | Malik et al. | |
| 2012/0290601 A1 | 11/2012 | Huang | |
| 2013/0226928 A1 * | 8/2013 | Bier | G06F 17/30241 707/741 |
| 2014/0025626 A1 * | 1/2014 | Mefford | G06F 17/30864 707/603 |

OTHER PUBLICATIONS

Beretta et al., "Perceptually lossy compression of documents", HPL-97-23, Jan. 1997, 13 pgs.

Evans, Christopher, "Notes on the OpenSURF Library," Jan. 18, 2009, 25 pages.

Kesavamurthy et al., "Pattern Classification using imaging techniques for Infarct and Hemorrhage Identification in the Human Brain," Calicut Medical Journal 2006; 4(3):e1, 5 pages.

Klein, "A2iA, Recognizing the Worlds's Handwriting", Mar. 26, 2009, pp. 1-13.

Nielson, Heath and Barrett, William, "Automatic Zoning of Digitized Documents," available at: http://fht.byu.edu/prev_workshops/workshop01/final/Nielson.pdf, last visited Aug. 25, 2010, 2 pages.

Ye, Xiangyun et al., "A Generic System to Extract and Clean Handwritten Data from Business Forms," Proceedings of the Seventh International Workshop on Frontiers in Handwriting Recognition, Sep. 11-13, 2000, pp. 63-72.

"Hausdorff Distance Image Comparison," available at http://www.cs.cornell.edu/Vision/hausdorff/hausdist.html, copyright 2000, 2 pages [retrieved on Jul. 2, 2009].

"Optical Mark Recognition," Wikipedia, the free encyclopedia, available at: http://en.wikipedia.org/wiki/Optical_mark_recognition, last modified on Oct. 16, 2009, pp. 1-6 [retrieved on Oct. 21, 2009].

* cited by examiner

FIG. 13

CONTEXTUALIZATION OF MACHINE INDETERMINABLE INFORMATION BASED ON MACHINE DETERMINABLE INFORMATION

CROSS-REFERENCE TO RELATED APPLICATIONS

This application is a divisional of U.S. patent application Ser. No. 12/859,328, filed Aug. 19, 2010, which is a continuation-in-part of U.S. patent application Ser. No. 12/695,009, filed on Jan. 27, 2010. The entire contents of each of these documents are incorporated by reference herein.

TECHNICAL FIELD

The present description relates generally to a system and method, generally referred to as a system, for contextualizing machine indeterminable information based on machine determinable information, and more particularly, but not exclusively, to extracting machine determinable information from an electronic document image and utilizing a portion, or combination, of the machine determinable information, to contextualize the machine indeterminable information. The contextualized machine indeterminable information is presented to a user so that the user may provide a determination associated with the machine indeterminable information, such as an identification thereof, or so that the user may otherwise process the machine indeterminable information or facilitate further processing of the machine determinable information, machine indeterminable information or combinations thereof.

BACKGROUND

Although many transactions formerly performed using physical documents are now performed online or otherwise electronically, there still remain many transactions which are mainly performed using physical documents, particularly in the banking, healthcare and financial industries. For example, any transaction requiring an actual signature of a person may typically be performed via the exchange of physical documents bearing the requisite signature. These transactions may be performed using forms, upon which a person may provide information, make one or more selections and/or provide a signature. The forms may then be sent to a receiving organization which handles, collates and otherwise processes the forms. The forms may be sent to the receiving organization physically, such as via standard mail, or the forms may be sent to the receiving organization electronically, such as via email, facsimile, or any other form of electronic communication. The receiving organization may be provided or contracted by one or more entities, such as one or more banks, healthcare service firms, financial service firms, or generally any organization which receives or otherwise processes physical forms or other physical documents. Upon receiving the forms, the organization may review each form to determine that the form was filled out correctly and contains any required handwritten information. The organization may extract the handwritten information from the form, or otherwise validate the form, and may classify the form for further processing based on the context of the form. Since the number of forms received by the receiving organization can number well into the hundreds of thousands, the receiving organization may desire an efficient and accurate mechanism for extracting information from the forms, classifying the forms and routing the forms to appropriate destinations for handling.

SUMMARY

A system for contextualizing machine indeterminable information based on machine determinable information may include a memory, an interface, and a processor. The memory may be operative to store an electronic document image. The electronic document image may include information determinable by a machine and information indeterminable by a machine. The interface may be coupled with the memory and may be operative to receive the electronic document image and to communicate with a device of a user. The processor may be coupled with the interface and may be operative to receive, via the interface, the electronic document image. The processor may determine the machine determinable information of the electronic document image and may identify the machine indeterminable information of the electronic document image. The processor may contextualize the machine indeterminable information based on the machine determinable information. The processor may present the contextualized machine indeterminable information to the user to facilitate interpretation thereof. In response thereto, the processor may receive, via the interface, data representative of a user determination associated with the machine indeterminable information.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 13 is a screenshot of a graphical user interface for scale modified manipulation of an electronic document image for data extraction in the system of FIG. 1, or other systems for contextualizing machine indeterminable information based on machine determinable information.

DETAILED DESCRIPTION

Figure 1:
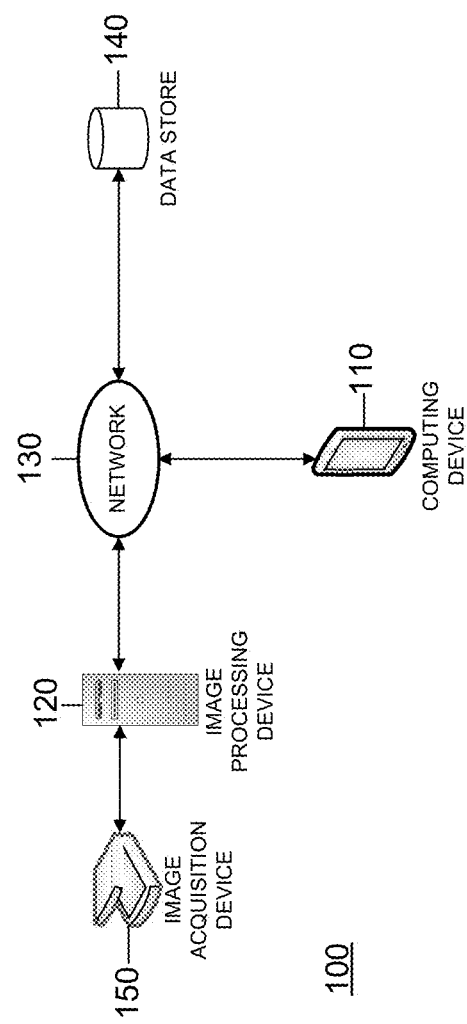
FIG. 1 is a block diagram of a general overview of a system for contextualizing machine indeterminable information based on machine determinable information.

The disclosed embodiments relate to a system for contextualizing machine indeterminable information based on machine determinable information, and more particularly, but not exclusively, to extracting machine determinable information from an electronic document image and utilizing a portion, or combination, of the machine determinable information, to facilitate contextualization, with a significant likelihood, the machine indeterminable information. The contextualized machine indeterminable information may be presented to a user so that the user may provide a determination associated with or based on the machine indeterminable information, such as an identification thereof, or so that the user or system may otherwise further process the machine determinable information, the machine indeterminable information, or a combination thereof. For illustrative purposes the principles described herein may be referenced in the specific embodiment of contextualizing machine indeterminable information based on machine determinable information on an electronic document image; however the principles may be embodied in many different forms.

The system may be implemented in any environment where a machine is used to determine information contained in an electronic document image. For example, the system may be implemented in an electronic document image processing system, an electronic document image sorting system, a check scanning system, such as an automated teller machine (ATM), or generally any system which attempts to determine information from an electronic document image. Electronic document images in any such implementation may include information which is determinable by a machine, i.e. machine determinable information, such as bar codes, recognizable characters, or other machine readable information, and information which is indeterminable by a machine, i.e. machine indeterminable information. For example, an electronic document image processing system may process electronic document images containing information determinable by a machine, such as typographic information, and information indeterminable by the machine, such as a signature, or other handwritten information, or human applied information. In another example, an ATM may process electronic document images of deposited checks which include machine determinable information, such as a bar code or variants thereof, and machine indeterminable information, such as the handwritten amount of the check, or a signature. In both instances the machine indeterminable information may be presented to an operator for identification, or processing. The system facilitates the operator by contextualizing the machine indeterminable information, based on the machine determinable information, and presenting the contextualized machine indeterminable information to the operator for identification or processing thereof. By presenting the contextualized machine indeterminable information to the operator, the system may expedite the operator's identification and/or processing of the machine indeterminable information by narrowing the possible values of the machine indeterminable information to the context provided by the machine determinable information.

For example, the system may receive an electronic document image containing information determinable by a machine and information indeterminable by a machine. The system may determine the machine determinable information, such as through optical character recognition (OCR), intelligent word recognition (IWR), bar code scanning, or generally any machine implemented method of determining information. The system may identify the remainder of the information on the electronic document image as machine indeterminable information. The system may contextualize the machine indeterminable information based on the machine determinable information. For example, an entity associated with the electronic document image may be machine determinable, such as by processing a logo on the electronic document image; however, a classification of the electronic document image, such as a document type of the electronic document image, may be machine indeterminable. In this example, the machine indeterminable information, i.e. the document type, may be contextualized based on the machine determinable information, i.e. the entity associated with the electronic document image, by presenting the operator with identifications of the document types associated with the entity. The system thereby facilitates the operator in determining the document type by narrowing the possible document types to only those associated with the entity. The operator may evaluate the possible document types and may provide the system with the document type of the electronic document image. The system may then store the identification of the machine indeterminable information and/or may further process the electronic document image based on the identified machine indeterminable information, the machine determinable information, or a combination thereof.

The machine determinable information and the machine indeterminable information may vary according to each electronic document image and/or each implementation of the system. The system may utilize any known, or derivable, information about the context of an electronic document image for a given implementation to contextualize the machine indeterminable information based on the machine determinable information. For example, in an electronic document image processing system, each document, and corresponding electronic document image, used in the system may be associated with the aforementioned entity, or organization, such as a bank, a healthcare service firm, a financial service firm, or generally any organization which receives physical documents. The entity associated with the electronic document image may be machine determinable information or machine indeterminable information. The documents may be used by the entities to receive information from individuals related to performing transactions, operations, or other activities associated with the entity's business. For example, a bank may be associated with documents for performing withdrawal transactions, deposit transactions, account transfer transactions, or generally any transactions the bank may perform. An individual wishing to perform one of these transactions may add information to the appropriate document and send the document to the bank or an organization responsible for processing the documents received by the bank. Each entity may utilize different types of documents, or document types, to perform different transactions. The documents may be initially printed with typographic information which may include one or more fields for individuals to add information to the form which is associated with the corresponding transaction. For example, a change of address document may include fields for an individual to add their account number, name, new address, or generally any other information relating to a change of address transaction. The documents may also include an identifying mark, such as a logo, insignia, or other identifying mark of the entity associated with the document. The typographic information and the identifying mark may be machine determinable information or machine indeterminable information. A document as initially generated for a given document type and associated entity, without any information added by an individual, may be referred to as the template for the document type. The system may store the document types used in the system as well as a template for each document type in a data store. The document type of the electronic document image may be machine determinable or machine indeterminable information. Thus, when the system receives an electronic document image, a document type of the electronic document image may be determined by comparing the electronic document image to the stored templates. Once the template is identified, any information which is included on the electronic document image but is not part of the template may be identified as information added to the corresponding document by an individual. The information added to the document by a user may also be machine determinable or machine indeterminable information. Generally any information contained on an electronic document image, derivable from the electronic document image, or related to the electronic document image may be machine determinable or machine indeterminable information.

An electronic document image processing system may include additional information which may be machine determinable, machine indeterminable and/or used to contextualize the machine indeterminable information based on the machine determinable information. For example, each document type may be associated with metadata containing information related to an electronic document image characterized by the document type. The metadata of an electronic document image may be machine determinable, machine indeterminable, and/or may be used to contextualize the machine indeterminable information based on the machine determinable information. The metadata may include the relative location of regions of the electronic document image where information is expected to be added by an individual, such as the coordinates of two or more points identifying the boundary of a region. The metadata may include an indication of whether information in each of the regions is mandatory or optional, and the metadata may include a data type for the information expected in each region, such as numeric, alphanumeric, checkmark, or generally any data type which may be used on a document. The metadata may also identify a data field in a database associated with each region of the template. The metadata may also include one or more criteria and associated actions associated with the document type. The criteria may describe conditional evaluations of the information added to a document characterized by the document type. The associated actions may describe one or more actions to be performed based on the outcomes of the conditional evaluations. For example, the criteria may be validation criteria which may verify that the mandatory information, such as a signature, is included in the electronic document image. The actions associated with the validation criteria may relate to handling the electronic document image if mandatory information is not present. The electronic document image may be handled differently depending which mandatory information is missing from the electronic document image. Alternatively or in addition, the criteria may be routing criteria which evaluates the electronic document image to determine how the electronic document image should be routed. The action associated with the routing criteria may indicate various destinations to which the electronic document image should be routed based on the outcomes of the conditional evaluations of the routing criteria. For example, an account manager may wish to receive a copy of every electronic document image which includes an account number of an account managed by the account manager, or of high value accounts managed by the account manager. Alternatively or in addition, the criteria may be alert criteria for communicating one or more alerts based on the information added to the form by the individual. The action associated with the alert criteria may be communicating the alerts to various individuals through any messaging service, such as email, text messaging, instant messaging, social network messaging, or generally any messaging service. For example, a supervisor, or manager, may wish to be alerted to high value transactions, or transaction identified as potentially fraudulent. The alert may include a network identifier for securely viewing the electronic document image, or may include a copy of the electronic document image.

The electronic document image processing system may receive electronic document images of documents associated with the entities, such as documents received from individuals engaging in transactions or operations with, or through, the entities. For example, the documents may be received physically via a ground shipping service, such as the United States Postal Service, and then may be processed, such as scanned, to generate an electronic document image thereof. Alternatively or in addition, the electronic document images may be receive electronically, such as via fax, via email, via a web page submission, or generally via any mode of transmitting, or communicating electronic document images. The system may process an electronic document image to determine the machine determinable information and the machine indeterminable information. For example, the document type of the electronic document image and the user added information on the electronic document image may be machine determinable information, but the context of the user added information may be machine indeterminable. The system may determine the document type by comparing the electronic document image to stored templates of known document types. Once the document type is determined, the system may contextualize the machine indeterminable information, e.g. contextualize the user added information, by retrieving the metadata associated with the determined document type. The system may use the metadata to identify the relative locations of the regions on the electronic document image, any action criteria and any associated actions. The system may extract information, or data items, from the regions of the electronic document image identified in the metadata. For example, for each region, the system may perform optical character recognition (OCR), intelligent word recognition (IWR), or generally any algorithm capable of extracting information from the electronic document image. The system may store the data items extracted from the electronic document image in the data fields of the database, each data field being associated with each region as described by the metadata. The system may determine whether the electronic document image satisfies any of the action criteria. If an action criterion is satisfied, the system initiates the action associated with the action criterion.

In order to present the contextualized machine indeterminable information to the operator, the system may assemble a graphical user interface which displays the electronic document image and the contextualized machine indeterminable information. The graphical user interface may facilitate the operator's interpretation of the machine indeterminable information and the receipt thereof. An operator may use the interface to identify or otherwise process any of the machine indeterminable information. For example, the graphical user interface may include editable fields containing the data items as extracted from the regions, if any. The editable fields may be displayed separately from the electronic document image, may be superimposed over the associated regions of the electronic document image, such as through a popup window, or may be displayed adjacent to the regions from which each data item was extracted, or generally may be displayed in any manner in which an operator can simultaneously view a region of the electronic document image and the associated editable field. An operator may input or modify the data items in each of the editable fields to identify any machine indeterminable information. The editable fields may be displayed prominently on the electronic document image, such as to draw the operator's attention to the editable fields as opposed to static information on the electronic document image. For example, the editable fields may be highlighted on the electronic document image. The color of the highlighting may be indicative of a confidence level that the machine determinable information has been accurately extracted from the electronic document image, or machine indeterminable information was accurately contextualized based on the machine determinable information. For example, data items extracted with a high level of confidence, or data items which satisfy a validation criterion, may be highlighted in green, while data items extracted with a low level of confidence, or data items which do not satisfy a validation criterion, may be highlighted in red.

Alternatively or in addition, the system may be unable to determine a single document type corresponding to the electronic document image, but may be able to determine a subset of the known document types which may correspond to the electronic document image. In this instance, the document type may be machine indeterminable; however, the subset of known document types may be machine determinable. The system may determine a likelihood value for each document type in the subset of document types. The likelihood value of each document type may indicate a likelihood that the document type corresponds to the electronic document image. Alternatively or in addition, if the system is able to determine the entity associated with the electronic document image, the system may filter the possible document types to only include document types associated with the determined entity. The system may assemble graphical user interface which displays the electronic document image and selectors, such as buttons, corresponding to each of the possible document types. A graphical attribute of each selector may be modified to indicate the likelihood that the document type represented by the selector corresponds to the electronic document image. For example, a selector of a document type having a high likelihood may be displayed more prominently, such as with a higher brightness, than a document type having a low likelihood. The system may provide the graphical user interface to a computing device. The system may receive, from the computing device and through the graphical user interface, a selection of the selector corresponding to the document type of the electronic document image. For example, an operator may use the graphical user interface to select the selector representing the document type corresponding to the electronic document image, and thereby providing an identification associated with the contextualized machine indeterminable information. The system may then retrieve the metadata associated with the selected document type and may perform the data extraction, and criteria evaluation operations described above.

Alternatively or in addition, the relative location of the information added by an individual on an electronic document image may be machine determinable information which can be used to contextualize machine indeterminable information, such as the document type of the electronic document image. For example, the system may compare the relative location of the information added by an individual to the relative location of the regions described in the metadata of the document types. If the electronic document image includes information added by an individual in all the regions described in the metadata of a document type, then there may be a high likelihood that the electronic document image is characterized by the document type. The system may present an identification of the document type to the operator with an indication of the determined likelihood.

The system also may provide a graphical user interface which allows an operator to identify information to be stored as metadata for a given electronic document image. The metadata may then be machine determinable information which can be used to contextualize machine indeterminable information. For example, if an electronic document image is received for which there is no known document type, the system may create a new document type for the electronic document image and may provide the graphical user interface to a computing device. The operator may use the graphical user interface to identify metadata to be associated with the new document type. For example, the operator may identify the regions of the electronic document image where information is expected to be added by an individual, such as by highlighting the regions of the electronic document image within the graphical user interface. The system may receive a description of the regions from the graphical user interface, such as coordinates describing the boundaries of the regions, and may store the description of the regions as metadata associated with the document type. The operator may also utilize the graphical user interface to identify action criteria and/or actions associated with the document type. The system may receive any identified action criteria and associated actions and may store the action criteria and associated actions as metadata associated with the document type. The system may also generate a template corresponding to the document type based on the electronic document image. For example, the system may remove any information contained within the identified regions of the electronic document image to generate a template. The resulting template may be stored in association with the metadata and the document type.

Alternatively, or in addition, the system may process an electronic document image to segregate the typographic information from handwritten information. The typographic information and the handwritten information may be machine determinable information or machine indeterminable information. The typographic information may represent the information initially printed on the document; thus, the segregated typographic information may be used to generate a template based on the electronic document image. The handwritten information may represent the information added to the document by a user. The segregated handwritten information may be used to accurately extract data items from the handwritten information. That is, the OCR or IWR may operate more effectively on an electronic document image containing only the segregated handwritten information rather than an electronic document image containing the handwritten information and the typographic information. The system may also perform the conditional evaluations associated with the criteria more effectively by utilizing the segregated handwritten information.

More detail regarding the aspects of systems for segregating handwritten information from typographic information, as well as their structure, function and operation, can be found in commonly owned U.S. patent application Ser. No. 12/695,009, filed on Jan. 27, 2010, entitled, "SEGREGATION OF HANDWRITTEN INFORMATION FROM TYPOGRAPHIC INFORMATION ON A DOCUMENT," which is hereby incorporated herein by reference in its entirety. The systems and methods herein, such as those associated with extracting information from electronic document images, may be practiced in combination with methods and systems described in the above-identified patent application incorporated by reference.

FIG. 1 provides a general overview of a system 100 for contextualizing machine indeterminable information based on machine determinable information. Not all of the depicted components may be required, however, and some implementations may include additional components. Variations in the arrangement and type of the components may be made without departing from the spirit or scope of the claims as set forth herein. Additional, different or fewer components may be provided.

The system 100 may include a computing device 110, an image processing device 120, a network 130, a data store 140, and an image acquisition device 150. The computing device 110 may display or otherwise provide a graphical user interface for use by an operator. The image acquisition device 150 may be used to generate one or more electronic document images from one or more mediums, such as paper documents, containing handwritten information and typographic information, or otherwise receive electronic document images from another source. For example, the documents may be forms which may include typographic information initially printed on the form, and handwritten information later applied to the form by an individual. The image acquisition device 150 may be a device capable of converting the medium, such as a document, into an electronic document image or otherwise receiving electronic document images from another source, such as from a storage device or via a wired or wireless network. For example, the image acquisition device 150 may be a scanning or camera device. The image processing device 150 may process a received electronic document image, such as to extract data from the electronic document image, classify the electronic document image based on the entity associated with the electronic document image and/or the document type of the electronic document image, and/or route the electronic document image to an appropriate individual or department for further processing.

The image acquisition device 150 may be in communication with the image processing device 120, the computing device 110, and the data store 140 through the network 130. Alternatively or in addition, the image acquisition device 150 may be in direct communication with one or more of the computing device 110, the image processing device 120, or the data store 140, such as through a universal serial bus (USB) connection, a serial connection, or generally any wired or wireless data connection. Alternatively or in addition, the image acquisition device 150 may be combined with one or more of the computing device 110, the image processing device 120, or the data store 140. For example, the image acquisition device 150 may be included in a handheld device with a camera, or scanning device which can capture an image of a document, such as an iPhone™ available from Apple, Inc, smartphones containing a camera or scanning device, a tablet device with a camera or scanning device, or generally any handheld device capable of generating an electronic document image from a document. Alternatively or in addition, the image acquisition device 150 may be capable of handling bulk amounts of documents or other media, such as scanner capable of handling thousands of documents per hour.

The computing device 110 may include a touchscreen, such as touchscreen provided by Elo TouchSystems™ of Menlo Park, Calif. The computing device 110 may be portable, such as a tablet device, or may be docked in a stationary stand. For example, a stationary stand may position the computing device 110 in varying positions, such as almost flat at approximately twenty-five degrees from a desktop, or ninety degrees from the desktop like a regular monitor. Exemplary tablet devices may include the iPad™ available from Apple, Inc., or any other tablet devices, such as those implementing the Android Operating System™ available from Google Inc., WebOS™ available from Hewlett-Packard Company, Microsoft Windows Mobile OS™ available from Microsoft Corporation, or generally any other operating system capable of running on a tablet device.

The operator may be one or more persons responsible for monitoring the progress of the system 100, such as via an operator interface (not shown). The operator may interact with the operator interface through a touchscreen display or other user input component of the computing device 110. The operator may use the operator interface to review the electronic document images generated by the image acquisition device 150. For example, the operator may review the entity and/or document type classifications of the electronic document image determined by the image processing device 120, and/or any data items extracted from the electronic document image by the image processing device 120.

The one or more operators and the computing devices 110 may be located proximal to other components of the system 100, such as in the same building or facility. Alternatively, the one or more operators and the computing devices 110 may be located geographically remote from the other components of the system 100. For example, the one or more operators and the computing devices 110 may be located in a different country than the other components of the system 100. Alternatively, or in addition, the one or more operators and the computing devices 110 may each be located geographically remote from one another and from the other components of the system 100.

If the image processing device 120 is unable to classify an electronic document image and/or extract data items from the electronic document image, the operator may use the operator interface to manually classify the electronic document image and/or manually identify data items in the electronic document image. In one example, the image processing device 120 may not be able to determine a single document type which characterizes the electronic document image, but the image processing device 120 may be able to identify several document types which may characterize the electronic document image. The image processing device 120 may determine a value for each document type indicative of a likelihood that the electronic document image is characterized by the document type. The operator interface may display a selector, or button, corresponding to each document type to the operator. A graphical attribute of the selector may be indicative of the likelihood that the document type corresponding to the selector characterizes the document. For example, the color of the selector may be indicative of the likelihood that the document type corresponding to the selector characterizes the electronic document image. The operator may review the electronic document image and may select the document type corresponding to the electronic document image.

The system 100 may store data items extracted from the handwritten information into data fields of the data store 140. The data fields of the data store 140 where the characters are stored may be determined based on the document type of the electronic document image and the location of the handwritten information relative to the typographic information. For example, the system 100 may store a data item extracted from handwritten information located on the electronic document image near a name field of the typographic information into a name data field of the data store 140. The operator interface may be a graphical user interface, such as the user interfaces shown in FIGS. 7-19.

The data store 140 may be operative to store data or information, such as data relating to the electronic document images, data extracted from the electronic document images, identifiers of entities associated with the electronic document images, the document types of the electronic document images, metadata and templates associated with the document types, or generally any data related to the system 100. The data store 140 may include one or more relational databases or other data stores that may be managed using various known database management techniques, such as, for example, SQL and object-based techniques. Alternatively or in addition the data store 140 may be implemented using one or more of the magnetic, optical, solid state or tape drives, or other storage medium available now or later developed. The data store 140 may be in communication with the image processing device 120 and the computing device 110 through the network 130. For example, the data store 140 may be a database server running database software, such as MICROSOFT SQL SERVER®, ORACLE®, IBM DB2® or any other database software, relational or otherwise. Alternatively or in addition, the data store 140 may be in communication with other computing devices, such as servers, through the network 130.

The network 130 may include wide area networks (WAN), such as the internet, local area networks (LAN), campus area networks, metropolitan area networks, or any other networks that may allow for data communication. The network 130 may include the Internet and/or the network 130 may be divided into sub-networks. The sub-networks may allow access to all of the other components connected to the network 130 in the system 100, or the sub-networks may restrict access between the components connected to the network 130. The network 130 may be regarded as a public or private network connection and may include, for example, a virtual private network or an encryption or other security mechanism employed over the public Internet, or the like.

The computing device 110 and the image processing device 120 may be connected to the network 130 in any configuration that supports data transfer. This may include a data connection to the network 130 that may be wired or wireless. The image processing device 120 may run a web application on any platform that supports web content, such as a web browser or a computer, a mobile phone, personal digital assistant (PDA), pager, network-enabled television, digital video recorder, such as TIVO®, video game console/device, automobile and/or any appliance or device capable of data communications.

The computing device 110 and/or the image processing device 120 may be a machine that has a processor, memory, a display, a user interface and a communication interface, such as the computing device described in FIG. 20 below. The processor may be operatively coupled with the memory, display and the interfaces and may perform tasks at the request of the standalone application or the underlying operating system. Herein, the phrase "coupled with" is defined to mean directly connected to or indirectly connected through one or more intermediate components. Such intermediate components may include both hardware and software based components. The memory may be capable of storing data. The display may be operatively coupled with the memory and the processor and may be capable of displaying information to the operator. The user interface may be operatively coupled with the memory, the processor, and the display and may be capable of interacting with an operator. The communication interface may be operatively coupled with the memory, and the processor, and may be capable of communicating through the network 130. The standalone application may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTION-SCRIPT®, amongst others.

The computing device 110 may be any mobile device that has a data connection and may run a mobile application. The data connection may be a cellular connection, a wireless data connection, an internet connection, an infra-red connection, a Bluetooth connection, or any other connection capable of transmitting data. For example, the mobile application may be an application running on an iPhone™ available from Apple, Inc.

Alternatively, or in addition, the system 100 may include many computing devices 110. For example, a receiving organization utilizing the system may employ multiple operators, each of whom uses a computing device 110. The computing devices 110 may all be located in one location, or one or more computing devices 110 may be located in various geographic locations. Each computing device 110 may be routed different electronic document images. The graphical user interface provided to each computing device by the system 100 may require that an operator authenticate, such as with a login and password, prior to reviewing electronic document images. As such, any operator may use any of the computing devices 110 in the system.

Figure 2:
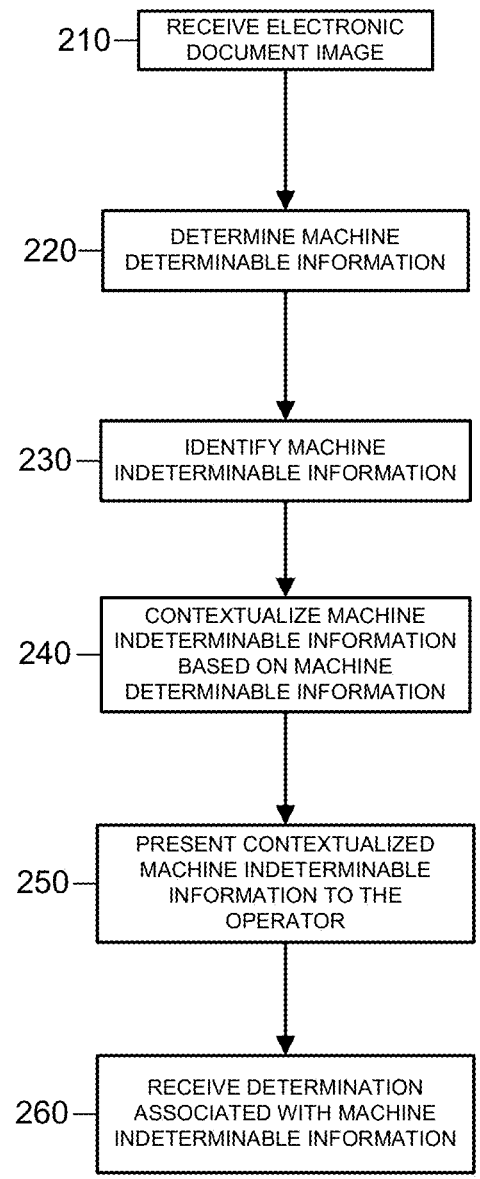
FIG. 2 is a flowchart illustrating the operations of contextualizing machine indeterminable information based on machine determinable information in the system of FIG. 1, or other systems for contextualizing machine indeterminable information based on machine determinable information.

FIG. 2 is a flowchart illustrating the operations of extracting data from an electronic document image and classifying the electronic document image in the system of FIG. 1, or other systems for contextualizing machine indeterminable information based on machine determinable information. The steps of FIG. 2 are described as being performed by the image processing device 120. However, the steps may be performed by the processor of the image processing device 120, or by any other hardware component of the image processing device 120. Alternatively the steps may be performed by another computing device or an external hardware component.

At step 210, the image processing device 120 receives an electronic document image, such as an electronic document image generated by the image acquisition device 150, or an electronic document image received from another source. At least a portion of the electronic document image may be determinable by a machine, and the remainder may be indeterminable by a machine. At step 220, the image processing device 120 determines information of the electronic document image which is machine determinable. For example, the image processing device 120 may determine the entity associated with the electronic document image. For example, the image processing device 120 may determine a document type classification of the electronic document image. As mentioned above, the document type may be determined by comparing the electronic document image with document templates of known document types.

Alternatively or in addition, the image processing device 120 may determine the entity associated with the electronic document image. The entity may be an organization or corporation associated with the typographic information on the electronic document image. For example, an organization, such as a bank, may be associated with documents related to performing bank transactions. Alternatively or in addition, the entity may be an organization or corporation associated with a transaction described by the typographic information of the electronic document image. The forms may include a logo of the entity, an insignia of the entity, a bar code associated with the entity, or some other identifying mark of the entity. The image processing device 120 may identify a cluster of pixels which represent the identifying mark which identifies the entity.

At step 230, the image processing device 120 may identify information of the electronic document image which is indeterminable. For example, if the image processing system 120 is unable to determine the entity with certainty in step 220, the entity associated with the electronic document image may be machine indeterminable information. Alternatively, if the image processing system 120 is unable to determine the document type with certainty, the document type may be the machine indeterminable information. Alternatively, or in addition, any information on the electronic document image which is not machine determinable information may be machine indeterminable information.

At step 240, the image processing device 120 contextualizes the machine indeterminable information based on the machine determinable information. For example, if the document type of the electronic document image is machine determinable, and the entity associated with the electronic document image is machine indeterminable, the image processing device 120 may contextualize the entity based on the document type. In this example, the image processing device 120 may be able to narrow the possible entities to only those associated with the determined document type. Alternatively, if the entity is machine determinable information and the document type is machine indeterminable information, the image processing device 120 may use the entity to contextualize the document type. For example, the image processing device 120 may be able to narrow the possible document types of the electronic document image to those associated with the determined entity.

At step 250, the image processing device 120 presents the contextualized machine indeterminable information to the operator. The image processing device 120 may assemble a graphical user interface for presenting the contextualized machine determinable information, and receiving a determination associated therewith from the operator. For example, the graphical user interface may present the possible entities associated with the electronic document image as contextualized based on the determined document type of the electronic document image. Alternatively, the graphical user interface may present the possible document types of the electronic document image as contextualized based on the determined entity associated with the electronic document image. The image processing device 120 may provide the graphical user interface to the computing device 110. The operator may utilize the graphical user interface on the computing device 110 to provide a determination associated with the machine indeterminable information.

At step 260, the image processing device 120 may receive a determination associated with the machine indeterminable information from the operator. For example, the operator may provide an identification of the machine indeterminable information. Alternatively, or in addition, the operator may provide an identification of further processing required of the electronic document image based on the machine indeterminable information. Alternatively, or in addition, the operator may provide an identification of a destination to route the electronic document image based on the machine indeterminable information. For example, the electronic document image may be routed to the entity associated therewith, a department responsible for handling the electronic document image, an individual the electronic document image is addressed to, an individual who added information to the document represented by the electronic document image, or generally any entity or individual capable of handling the electronic document image.

The image processing device 120 may store the machine determinable information and the identified machine indeterminable information, such as in the data store 140. The image processing device 120 may also determine a destination to route the electronic document image, if a destination was not identified by the operator. The destination may be based on the entity associated with the electronic document image, the document type of the electronic document image, the information extracted from the electronic document image, or a combination thereof.

Alternatively or in addition, each document type may be associated with one or more criteria, or rules, stored as metadata in the data store 140. Each criterion may be associated with an actions to perform if the criterion is satisfied and/or if the criterion is not satisfied. The criteria may describe conditional evaluations of information on the electronic document image. For example, a validation criterion may evaluate whether information added by an individual is present within regions of the electronic document image associated with mandatory information. The image processing device 120 may analyze the electronic document image to verify that the criteria of the document type are satisfied by the electronic document image. If the regions do not include the required information, and the validation criterion is not satisfied, the associated action may indicate that the electronic document image should be routed to an administrator or other exception handling personnel.

Alternatively or in addition, one or more users may request to receive alerts when a document type of an entity is received. The alerts may be associated with one or more criteria for which indicate when the alerts should be sent for a given document type. For example, a user may wish to be alerted to any electronic document image characterized by a financial document type which relates to a transaction of greater than a certain value. Alternatively or in addition, an account manager may wish to be alerted to any documents pertaining to their most valuable accounts. The image processing device 120 may analyze the electronic document image to determine whether any of the alert criteria associated with the document type characterizing the electronic document image are satisfied. The image processing device 120 may initiate an associated alert action for each alert criterion that is satisfied. The one or more alert criteria associated with each entity and/or document type may be stored as metadata in the data store 140.

Alternatively or in addition, each document type of an entity may be associated with one or more conditional actions. For example, the conditional actions may be dependent upon the information extracted from the electronic document image. The conditional actions for each document type may be stored in the data store 140. For example, a document type for a financial transaction may be routed to different individuals depending on the party initiating the transaction, the value of the transaction, or generally any other information pertaining to the transaction. In this example, there may be one or more conditional actions associated with the document type, and each conditional action may include one or more criteria which need to be satisfied in order for the conditional action to be performed. For each conditional action associated with the document type which characterizes the electronic document image, if the criteria are satisfied, the action is performed by the image processing device 120. In one example, the conditional actions may generally include the alert criteria and the routing criteria discussed above.

Figure 3:
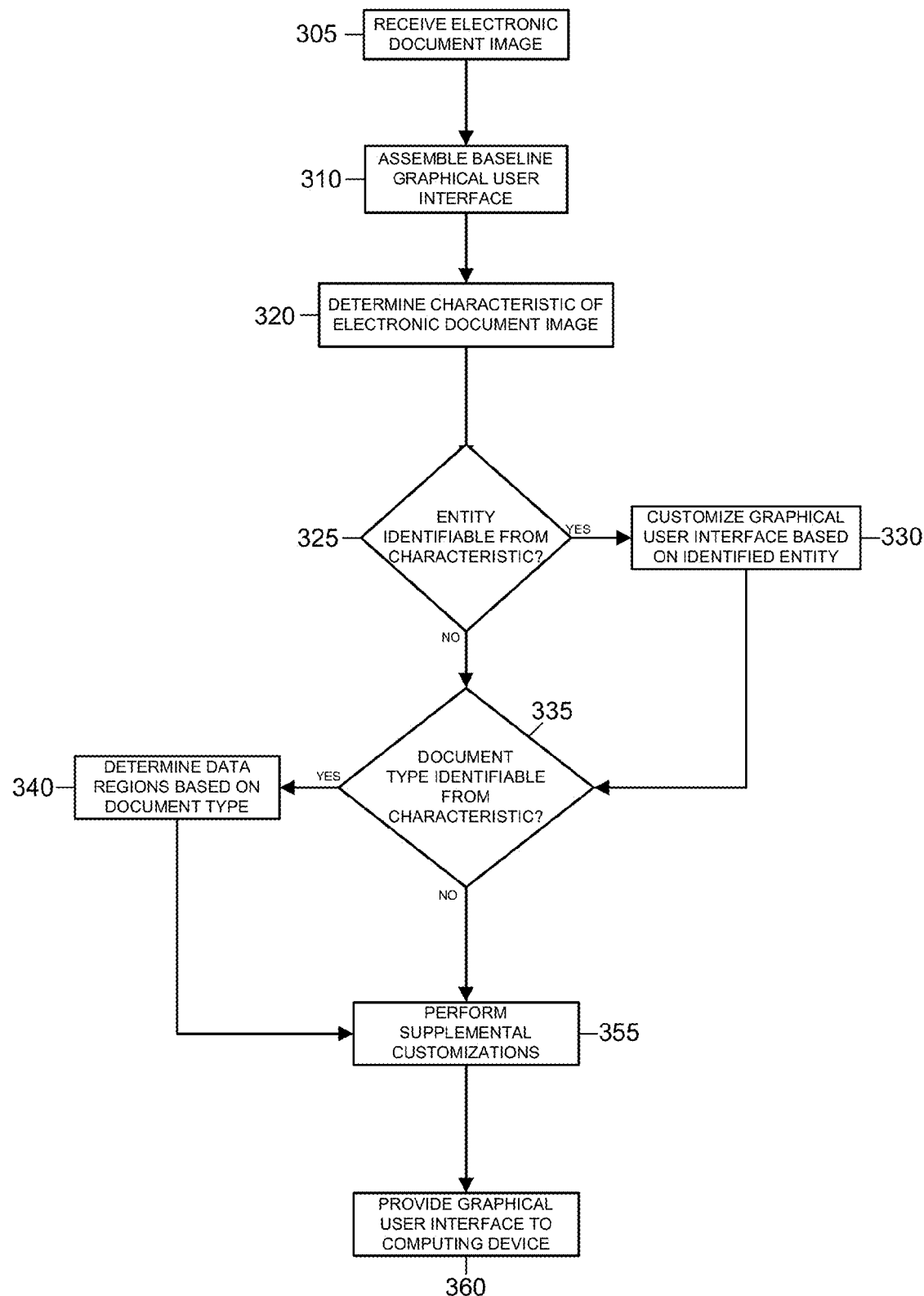
FIG. 3 is a flowchart illustrating the operations of customizing a graphical user interface for contextualizing machine indeterminable information based on machine determinable information in the system of FIG. 1, or other systems for contextualizing machine indeterminable information based on machine determinable information.

FIG. 3 is a flowchart illustrating the operations of customizing a graphical user interface for contextualizing machine indeterminable information based on machine determinable information in the system of FIG. 1, or other systems for contextualizing machine indeterminable information based on machine determinable information. The steps of FIG. 3 are described as being performed by the image processing device 120. However, the steps may be performed by the processor of the image processing device 120, or by any other hardware component of the image processing device 120. Alternatively the steps may be performed by another computing device or an external hardware component.

At step 305, the image processing device 120 receives an electronic document image, such as an electronic document image generated by the image acquisition device 150, or an electronic document image received from another source. At step 310, the image processing device 120 may assemble a baseline graphical user interface for data entry. The graphical user interface may be used by an operator to view the electronic document image and identify the entity associated with the electronic document image and/or identify the document type of an electronic document image. The graphical user interface may also be used by an operator to identify information to extract from the electronic document image. The baseline graphical user interface may include selectors, such as buttons, representing each of the entities stored in the data store 140, and/or selectors representing each of the document types stored in the data store 140.

At step 320, the image processing device 120 determines at least one machine determinable characteristic of the electronic document image, such as a characteristic indicative of the entity associated with the electronic document image, indicative of the document type of the electronic document image, or generally indicative of any information related to the electronic document image. For example, the image processing device 120 may determine an entity associated with the electronic document image by identifying a logo or mark of the entity on the electronic document image. Alternatively or in addition, the image processing device 120 may determine a document type of the electronic document image by comparing the electronic document image to templates of known document types. Alternatively or in addition, the image processing device 120 may identify handwritten information on the electronic document image and may perform OCR or IWR on the handwritten information.

At step 325, the image processing device 120 determines whether the entity associated with the electronic document image is identifiable from the characteristic of the electronic document image. If, at step 325, the entity is identifiable from the characteristic, the image processing device 120 moves to step 330. At step 330, the image processing device 120 customizes the baseline graphical user interface based on the identified entity, i.e. the entity is the machine determinable information and the document type is the machine indeterminable information. For example, the image processing device 120 may remove any document type selectors from the baseline graphical user interface representing a document type not associated with the identified entity. Thus, the customized graphical user interface may only include document type selectors for document types associated with the identified entity.

Alternatively or in addition, if the image processing device 120 is unable to identify the entity associated with the electronic document image, but is able to determine that one or more entities are not associated with electronic document image, the image processing device 120 may remove, or disable, the selectors representing the entities which are not associated with the electronic document image. Alternatively or in addition, if the image processing device 120 is unable to determine the entity associated with an electronic document image, the image processing device 120 may determine a likelihood that each entity is associated with the electronic document image. For example, if an electronic document image includes a logo which is similar to the logo of multiple entities, the image processing device 120 may be unable to determine, with certainty, which entity is associated with the electronic document image. However, the image processing device 120 may determine likelihoods, or probabilities, indicating whether each of the entities is associated with the electronic document image. For example, the likelihood may be based on how similar the logo of each entity is to the logo on the electronic document image. The image processing device 120 may modify a graphical attribute of the selector of each of the entities to indicate the likelihood that the entity represented by the selector is associated with the electronic document image. The selectors representing entities with a high likelihood of being associated with the electronic document image may be displayed more prominently than selectors representing entities with a low likelihood of being associated with the electronic document image. For example, the selector representing an entity with a high likelihood of being associated with the electronic document image may be displayed with a high level of brightness, while the selector representing an entity having a low likelihood of being associated with the electronic document image may be displayed with a low level of brightness. Alternatively or in addition, selectors representing entities having a high likelihood may be displayed in a first color, such as green, while selectors of entities having a low likelihood may be displayed in a second color, such as red. The first and second colors may linearly blend for entities with likelihoods falling between the highest likelihood and the lowest likelihood.

Alternatively or in addition, if the document type of the electronic document image is machine determinable, the image processing device 120 may filter out any entities not associated with the document type. Thus, the selectors representing entities which are not associated with the document type may be removed from the baseline graphical user interface.

If, at step 325, the entity is not determinable from the characteristic, the image processing device 120 moves to step 335. At step 335, the image processing device 120 determines if the document type is determinable from the characteristic. If, at step 335, the document type is determinable from the characteristic, the document type is machine determinable and the image processing device 120 moves to step 340. At step 340, the image processing device 120 determines the regions of the electronic document image where information is to be extracted, and the data fields of the data store 140 associated with the information to be extracted. The regions and data fields may be identified from metadata associated with the document type. The image processing device 120 may customize the graphical user interface by highlighting the regions of the electronic document image, such that the regions are displayed prominently to the operator. Alternatively or in addition, the image processing device 120 may perform OCR or IWR on each region of the electronic document image. The graphical user interface may display the data items extracted from each region adjacent to each region in editable fields. The operator may verify the accuracy of the OCR or IWR, and may update the editable representations of information, as necessary. Alternatively or in addition, the image processing device 120 may extract information from each region and may display the name of the data field associated with the region, as well as the information contained in the region, to the user.

Alternatively or in addition, if the image processing device 120 is unable to identify the document type corresponding to the electronic document image, but is able to determine that one or more document types do not correspond to the electronic document image, the image processing device 120 may remove, or disable, the selectors representing the document types which do not correspond to the electronic document image. Alternatively or in addition, if the image processing device 120 is unable to determine the document type corresponding to an electronic document image, the image processing device 120 may determine a likelihood that each possible document type corresponds to the electronic document image. For example, the image processing device 120 may use an image identification algorithm to compare the template of each document type with the electronic document image. The algorithm may determine a likelihood value indicating a likelihood that each document type corresponds to the electronic document image. The image processing device 120 may modify a graphical attribute of the selector of each of the document types to indicate the likelihood that the document type represented by the selector corresponds to the electronic document image. The selectors representing document types having a high likelihood may be displayed more prominently than selectors representing document types having low likelihoods. For example, the selector representing a document type with a high likelihood may be displayed with a high level of brightness, while the selector representing a document type with a low likelihood may be displayed with a low level of brightness. Alternatively or in addition, selectors representing document types having a high likelihood may be displayed in a first color, such as green, while selectors of document types having a low likelihood may be displayed in a second color, such as red. The first and second colors may linearly blend for document types with likelihoods falling between the highest likelihood and the lowest likelihood.

Alternatively or in addition, if the entity associated with the electronic document image is machine determinable, the image processing device 120 may use the entity to filter out any document types which are not associated with the entity. Thus, the selectors representing document types which are not associated with the entity may be removed from the baseline graphical user interface.

Alternatively or in addition, the image processing device 120 may determine whether any action criteria, or business rules, are associated with any electronic document images received sequentially proximate to the electronic document image. If business rules are associated with electronic document images received sequentially proximate to the electronic document image, the business rules may be used to filter the possible document types of the electronic document image. For example, a business rule may specify that a set of document types should be received sequentially proximate to each other. If one or more of the document types in the business rule have been received sequentially proximate to the current electronic document image, the image processing device 120 may increase the likelihood that the current electronic document image corresponds to other document types required by the business rule. Alternatively, or in addition, the image processing device 120 may decrease the likelihood that the electronic document image corresponds to document types not required by the business rule.

If, at step 335, the document type is not determinable from the characteristic, the image processing device 120 moves to step 355. At step 355, the image processing device 120 performs any additional customizations to the graphical user interface based on machine determinable information on the electronic document image. For example, the image processing device 120 may identify a characteristic indicative of an action to be initiated by the electronic document image, such as a financial transaction. In this example, the image processing device 120 may customize the graphical user interface by adding a keypad representation, such as a calculator keypad, to the graphical user interface. The keypad representation may be used to identify financial information on the electronic document image or perform mathematical calculations related to the financial transaction.

At step 360, the image processing device 120 may provide the graphical user interface to the computing device 110. The computing device 110 may display the graphical user interface to the operator. The operator may interact with the computing device 110, such as through the touchscreen of the computing device 110, to select the selectors representing the entity or document type. The operator may also use onscreen representations of keyboards, or keypads, to identify, or confirm, information contained on the electronic document image. Alternatively or in addition, the operator may interact with the computing device through any input device, such as a keyboard, a mouse, a voice activated device, or generally any device capable of translating interactions of the operator.

For example, the operator may view the information extracted from the electronic document image and the operator may confirm or modify the information extracted from each region of the electronic document image. Alternatively or in addition, the operator may confirm or modify a determined entity associated with the electronic document image and/or a document type of the electronic document image. For example, the graphical user interface may include a button the operator may select to indicate that the entity, document type, and information extracted from the electronic document image are accurate. Alternatively or in addition, if the image processing device 120 is able to determine, with a significant likelihood, the entity, the document type, and extract the required information from the electronic document image, the electronic document image may not be displayed to the operator at all.

Figure 4:
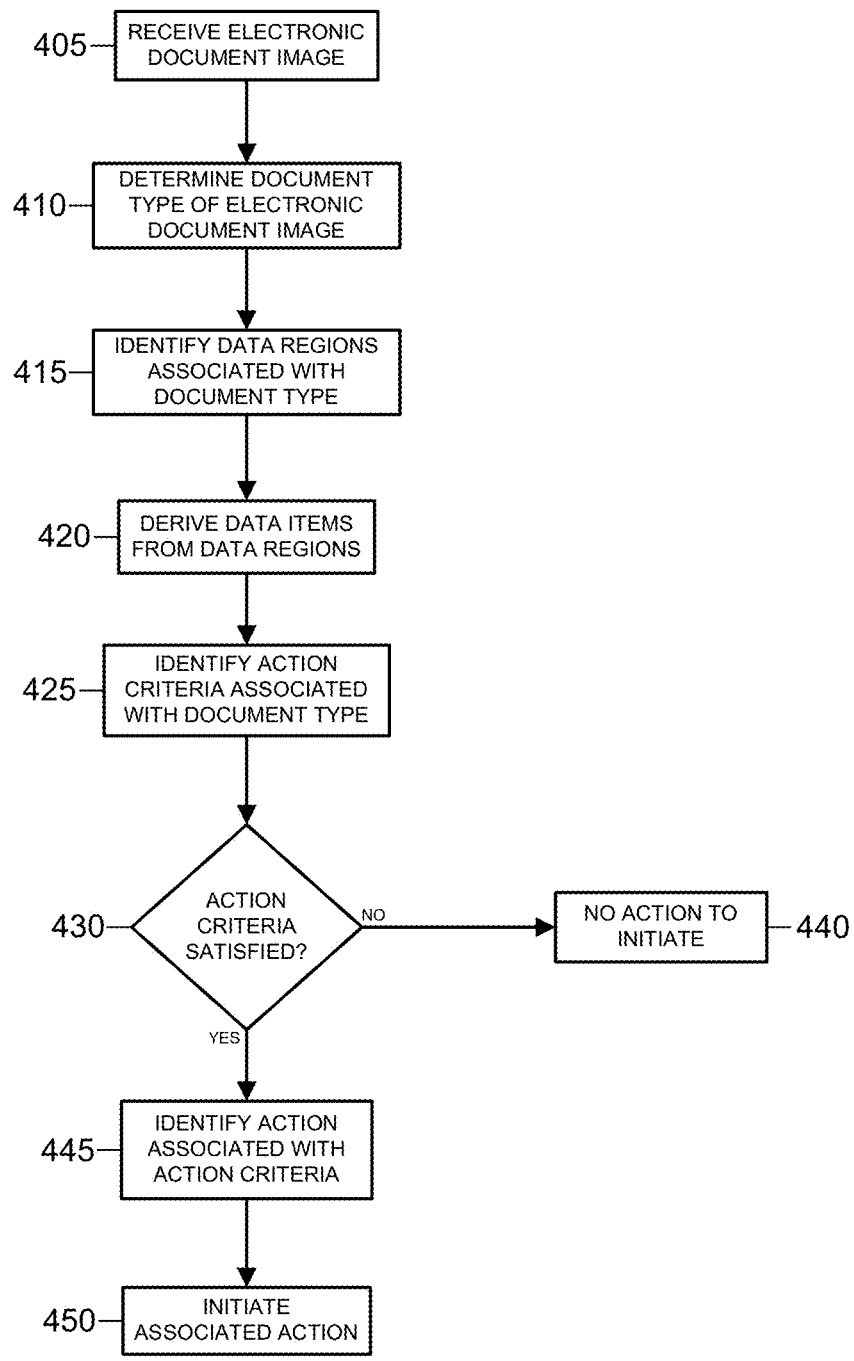
FIG. 4 is a flowchart illustrating the operations of processing and routing electronic document images in the system of FIG. 1, or other systems for contextualizing machine indeterminable information based on machine determinable information.
Figure 5:
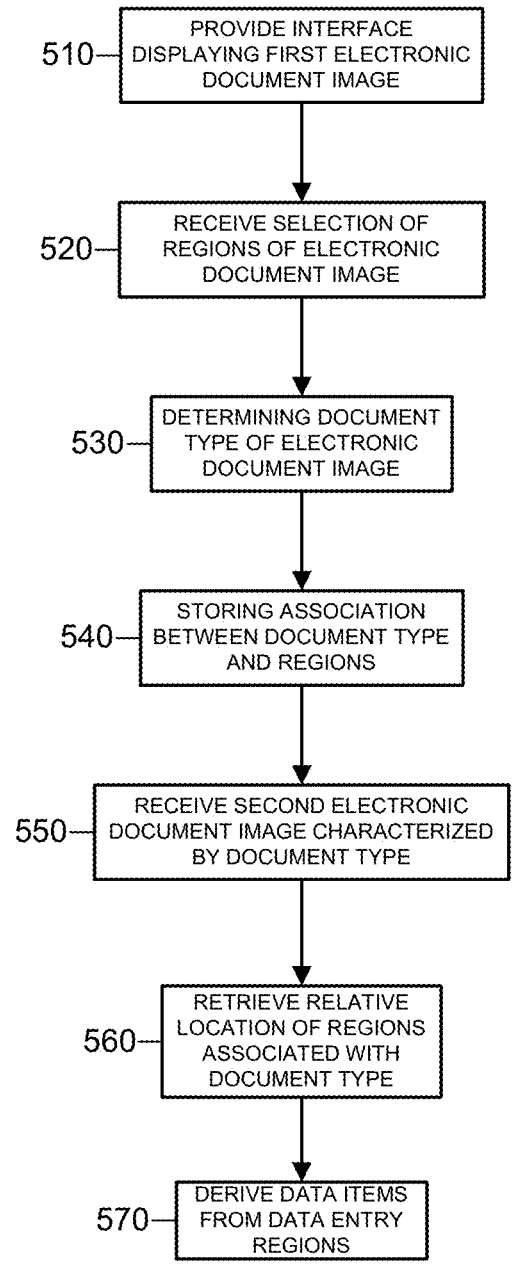
FIG. 5 is a flowchart illustrating the operations of providing a graphical user interface for associating regions of an electronic document image with a document type in the system of FIG. 1, or other systems for contextualizing machine indeterminable information based on machine determinable information.

FIG. 4 is a flowchart illustrating the operations of processing and routing electronic document images in the system of FIG. 1, or other systems for contextualizing machine indeterminable information based on machine determinable information. The steps of FIG. 5 are described as being performed by the image processing device 120. However, the steps may be performed by the processor of the image processing device 120, or by any other hardware component of the image processing device 120. Alternatively the steps may be performed by an external hardware component. Alternatively the steps may be performed by another computing device or an external hardware component.

At step 405, the image processing device 120 receives an electronic document image, such as an electronic document image generated by the image acquisition device 150, or an electronic document image received from another source. At step 410, the image processing device 120 determines the document type of the electronic document image, as described above. At step 415, the image processing device 120 identifies the regions of the electronic document image from which data should be extracted, and the corresponding data fields associated with the document type, as described above. At step 420, the image processing device 120 may extract information from the regions of the electronic document image, such as through OCR or IWR.

At step 425, the image processing device 120 may identify action criteria associated with the document type. For example, the action criteria may be stored in the metadata corresponding to the document type. Each action criterion may be associated with an action which is initiated when the action criterion is satisfied by an electronic document image, or the information contained therein. For example, actions may include initiating an alert communication related to the electronic document image, increasing the priority of an electronic document image, routing an electronic document image to one or more destinations, rejecting the electronic document image, or generally any action related to the electronic document image, or the information contained therein.

The action criterion may reference regions of the electronic document image, or the information contained therein. For example, a given action criterion of a document type may be satisfied when an electronic document image of the document type is missing information in a region, such as a signature. Alternatively or in addition, another action criterion may be satisfied when the electronic document image includes an identified name of an entity, or an individual, or an identified account number of an account. For example, an account manager may want copies of any electronic document images relating to accounts managed by the account manager. Alternatively or in addition an account manager may wish to increase a priority of any electronic document images which include the name or account number of valuable clients. For example, the electronic document images may be associated with a priority, such as a priority number indicating the order in which the electronic document images should be further processed. Electronic document images with a higher priority may be handled prior to electronic document images having a lower priority. Thus, electronic document images associated with valuable clients, or accounts, may have their priority increased such that they are handled prior electronic document images associated with less valuable accounts.

Alternatively or in addition, the alert criteria may be validation criteria. The validation criteria may provide validation evaluations for the electronic document image to verify the electronic document image includes expected information, in an expected format, and having an expected content. For example, the validation criterion may validate that all required information is included on the form by analyzing the regions of the electronic document image where information is expected. The validation criterion may also validate that the type of the information matches an expected type for the information within each of the regions. For example, a numerical value may be expected in a region of the electronic document image associated with an "Amount" data field. Lastly, if the image processing device 120 is able to extract information from the electronic document image, the validation criterion may further validate that the content of the information matches an expected content of the information. For example, if the image processing device 120 extracts an account number from the electronic document image, the validation criterion may validate that the account exists in the data store 140. If any of the evaluations of the validation criterion fail, the electronic document image may be rejected. Alternatively or in addition, an operator can specify one or more critical validation criterion, which, if not met by an electronic document image result in the electronic document image being rejected.

Alternatively or in addition, an action criterion may be associated with a set of electronic document images. In this instance the action criterion may function as a business rule for the group of electronic document images. For example, one or more document types may be dependent upon each other, such that if an electronic document image of one of the document types is received, then electronic document images of the other document types should be received sequentially proximate to the electronic document image. If electronic document images of the other document types are not received sequentially proximate to the electronic document image, the action criterion may indicate that the electronic document image should be rejected or flagged.

If, at step 430, the image processing device 120 determines that any of the action criteria are satisfied, the image processing device 120 moves to step 445. At step 445, the image processing device 120 identifies the action associated with the satisfied action criterion. At step 450, the image processing device initiates the action associated with the action criterion. If, at step 430, the image processing device 120 determines that none of the action criteria associated with the document type are satisfied, the image processing device 120 moves to step 440. At step 440, there are no actions for the image processing device 120 to initiate for the current electronic document image. Alternatively, or in addition, the action criteria may be associated with actions which are initiated when the action criteria are not satisfied.

Figure 6:
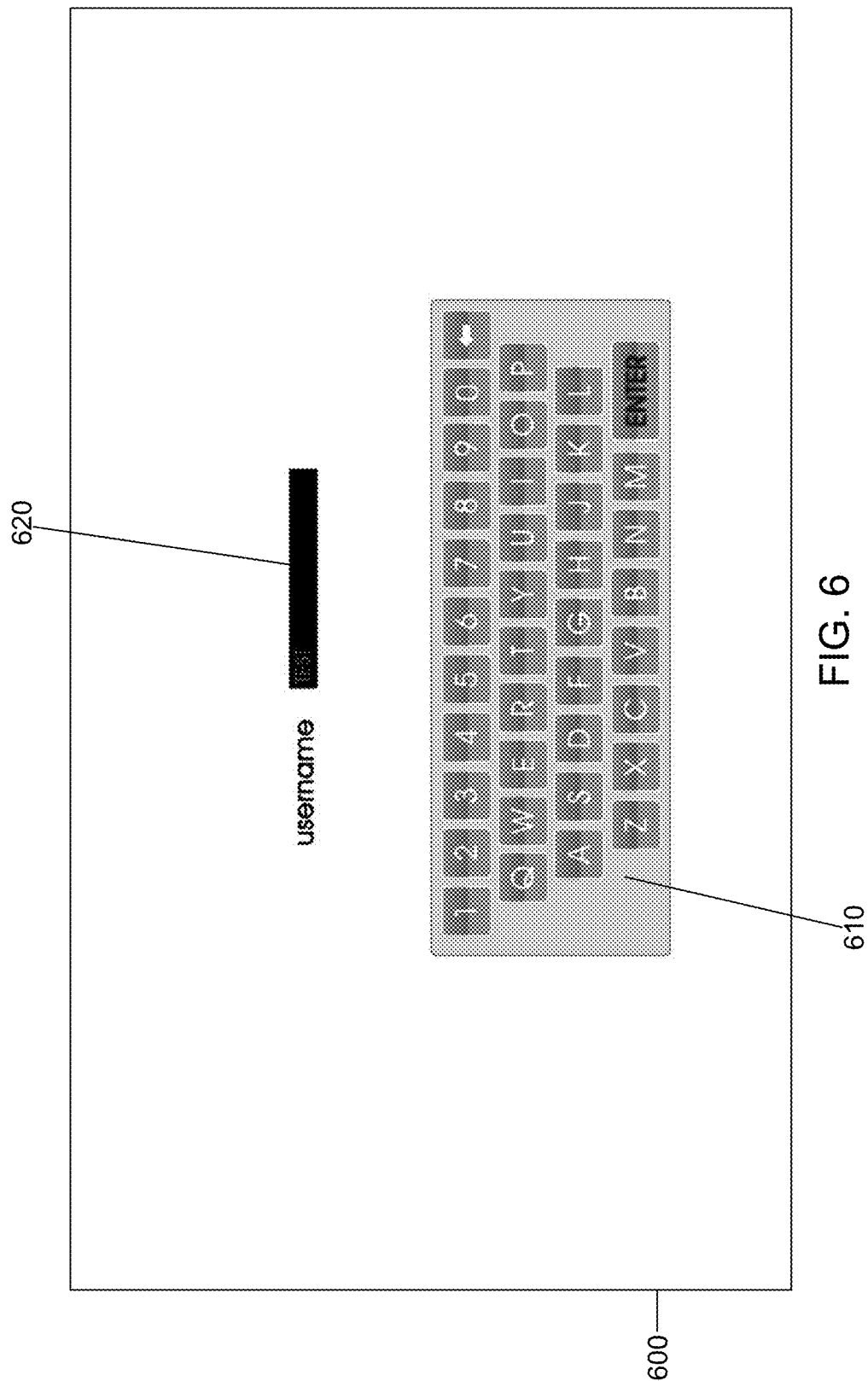
FIG. 6 is a screenshot of a graphical user interface for user authentication in the system of FIG. 1, or other systems for contextualizing machine indeterminable information based on machine determinable information.

FIG. 5 is a flowchart illustrating the operations of providing a graphical user interface for associating regions of an electronic document image with a document type in the system of FIG. 1, or other systems for contextualizing machine indeterminable information based on machine determinable information. The steps of FIG. 6 are described as being performed by the image processing device 120. However, the steps may be performed by the processor of the image processing device 120, or by any other hardware component of the image processing device 120. Alternatively the steps may be performed by another computing device or an external hardware component.

At step 510, the image processing device 120 provides a graphical user interface displaying a first electronic image to the computing device 110. At step 520, the image processing device 120 may receive a selection of regions of the first electronic document image though the graphical user interface. For example, an operator may interact with the graphical user interface to select one or more regions of the graphical user interface where information should be extracted.

At step 530, the image processing device 120 may determine a document type of the electronic document image, as discussed above. If the document type is unknown, or non-determinable, the image processing device 120 may create a new document type based on the electronic document image. The image processing device 120 may generate a template from the first electronic document image, as discussed above. At step 540, the image processing device 120 may store the document type and a description of the relative location of the selected regions on the electronic document image, such as in the data store 140.

At step 550, the image processing device 120 receives a second electronic document image characterized by the document type of the first electronic document image. At step 560, the image processing device 120 may retrieve the relative locations of the regions of the document type where data should be extracted, such as from the data store 140. At step 570, the image processing device 120 extracts information from the electronic document image within the retrieved regions, such as through OCR or IWR.

FIG. 6 is a screenshot of a graphical user interface 600 for user authentication in the system of FIG. 1, or other systems for contextualizing machine indeterminable information based on machine determinable information. The interface 600 may include a keyboard representation 710 and a login field 720. In operation, an operator may use the interface 600 to authenticate with the system 100.

Figure 7:
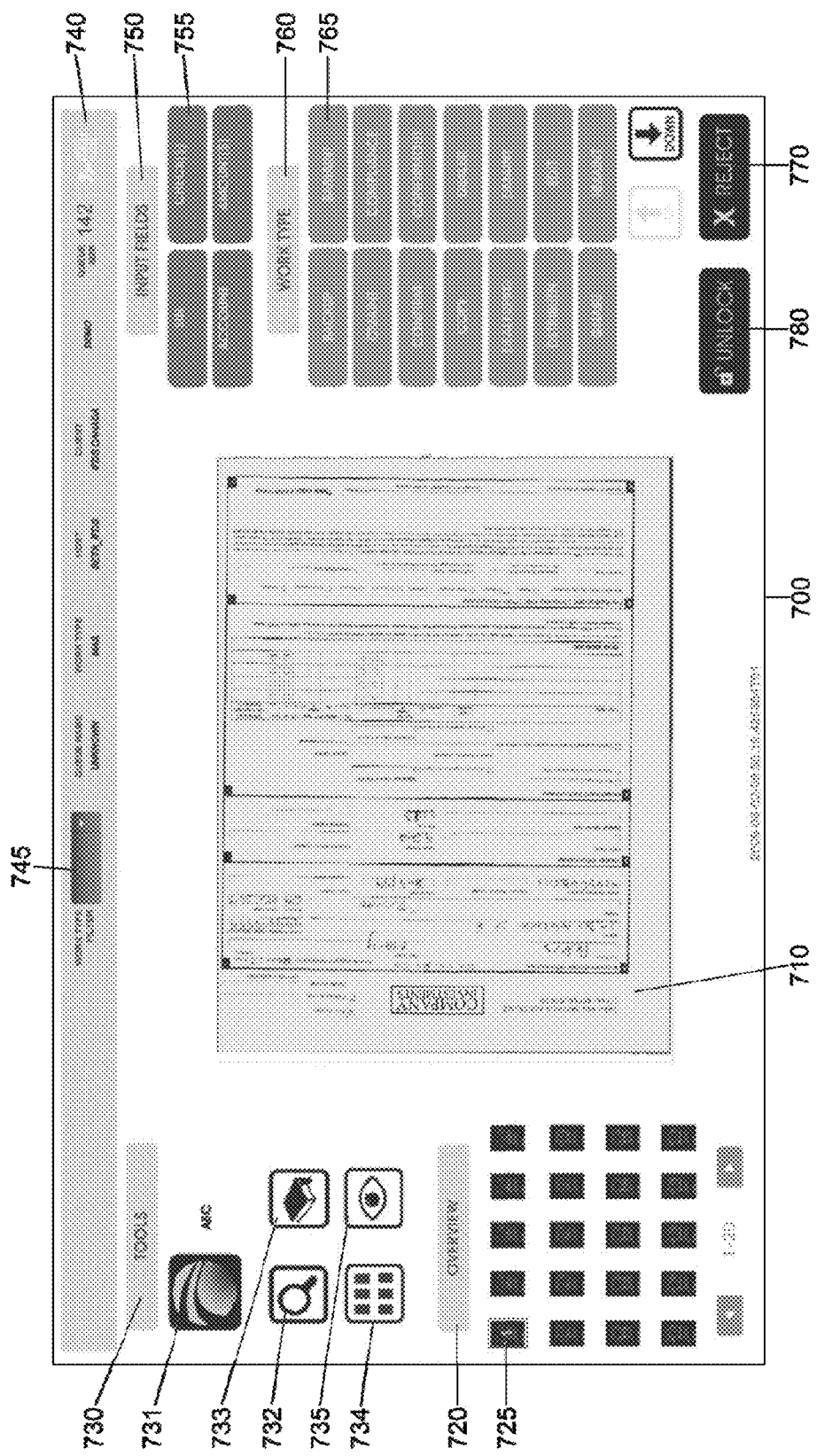
FIG. 7 is a screenshot of a graphical user interface for data extraction and classification of an electronic document image in the system of FIG. 1, or other systems for contextualizing machine indeterminable information based on machine determinable information.

FIG. 7 is a screenshot of a graphical user interface 700 for data extraction and classification of an electronic document image in the system of FIG. 1, or other systems for contextualizing machine indeterminable information based on machine determinable information. The interface 700 may include an electronic document image 710, a overview section 720, a tools section 730, an information section 740, an input fields section 750, a work type section 760, a reject selector 770, and an unlock selector 780. The overview section 720 may include one or more thumbnails 725 of electronic document images. The tools section 730 may include an entity identifier 731, a zoom selector 732, a business rules selector 733, a thumbnail navigation selector 734, and a quick view selector 735. The information section 740 includes a work type filter selector 745. The input fields section 750 includes one or more field selectors 755. The work type section 760, may include one or more work type selectors 765.

In operation, an operator may modify the entity associated with the electronic document image 710 by selecting the entity identifier 731. The operator may identify a document type, or work type, of the electronic document image, by selecting one of the work type selectors 765. The operator may use the work type filter 745 to filter the available work type selectors 765. The operator may manipulate the electronic document image 710 using the selectors 732, 733, 734, 735 of the tools section 730. For example, the zoom selector 732 may be used to change the scale of the electronic document image 710. The business rules selector 733 may provide the operator with access to business rules or other information stored in one or more knowledge based tools, such as wikis, spreadsheets, dictionaries, online resources, or generally any knowledge repository. The operator may select the thumbnail navigation selector 734 to view a thumbnail navigation interface, such as the interface 1000, while the operator may select the quick view selector 735 to view a quick view interface, such as the interface 1200.

Alternatively or in addition, if the computing device 120 displaying the interface 700 includes a touchscreen-like mechanism, the operator may use touch gestures to manipulate the electronic document image 710. For example, the operator may rotate the electronic document image 710, change the scale of the electronic document image 710, or generally perform any manipulation of the electronic document image using touch gestures.

The operator may identify information extracted from the electronic document image 710 using the input field selectors 755. The input field selectors 755 may be added to the graphical user interface by the image processing device 120 based on the data fields described in the metadata of the document type corresponding to the electronic document image 710. The selection of one of the input field selectors 755 may cause a representation of a keyboard, or a keypad, to appear on the interface 700. The operator may use the representation of the keyboard or the keypad to identify the information of the electronic document image corresponding to the input field.

The operator may view information relating to the electronic document image 710, or the overall classification process, in the information section 740. For example, the information section 740 may display the work type, or document type of the electronic document image 710, the host associated with the electronic document image and/or the client, or entity, associated with the electronic document image. The information section 740 may also display information relating to the overall classification process, such as the number of electronic document images currently in the queue to be classified.

The operator may use the reject selector 770, to reject the electronic document image 710. For example, if the electronic document image 710 is missing required information, such as a signature, the operator may use the reject selector 770 to reject the electronic document image. Alternatively or in addition, if the image processing device 120 determines that required information is missing from the electronic document image, such as a signature, the image processing device 120 may modify a graphical attribute of the reject selector 770, such that the reject selector 770 is displayed more prominently than the other selectors 755, 765. For example, the image processing device 120 may modify a graphical attribute of the reject selector 770 such that the reject selector 770 is highlighted, flashing, a darker color, such as red, or generally any graphical attribute change that may cause the reject selector 770 to be displayed to the operator more prominently.

Alternatively or in addition, if the image processing device 120 can determine a likelihood that the electronic document image corresponds to any of the document types, or work types, such as based on machine determinable information, the image processing device 120 may modify a graphical attribute of the work type selectors 765 such that the work type selectors 765 are indicative of the determined likelihood. For example, the work type selectors 765 having a higher likelihood may be displayed with a higher brightness than the work type selectors 765 having a lower likelihood.

Alternatively or in addition, the image processing device 120 may generate a details section. The details section may summarize the machine determinable information of the electronic document image 710 determined by the image processing device 120. The details section may include the numerical likelihoods of the electronic document image 710 corresponding to the individual work types, or document types, represented by the work type selectors 765. Alternatively or in addition, the computing device 110 may include an audio output, such as a speaker. The image processing device 120 may generate an audio summary of the information extracted from the electronic document image 710 by the image processing device. For example, the audio summary may indicate the most likely document type corresponding to the electronic document image 710.

Alternatively or in addition, when the operator selects, or touches, one of the work type selectors 765, the graphical user interface may display the likelihood of the electronic document image 710 corresponding to the document type represented by the selected work type selector 765. Alternatively or in addition, the operator may receive an audio indication of the likelihood.

Figure 8:
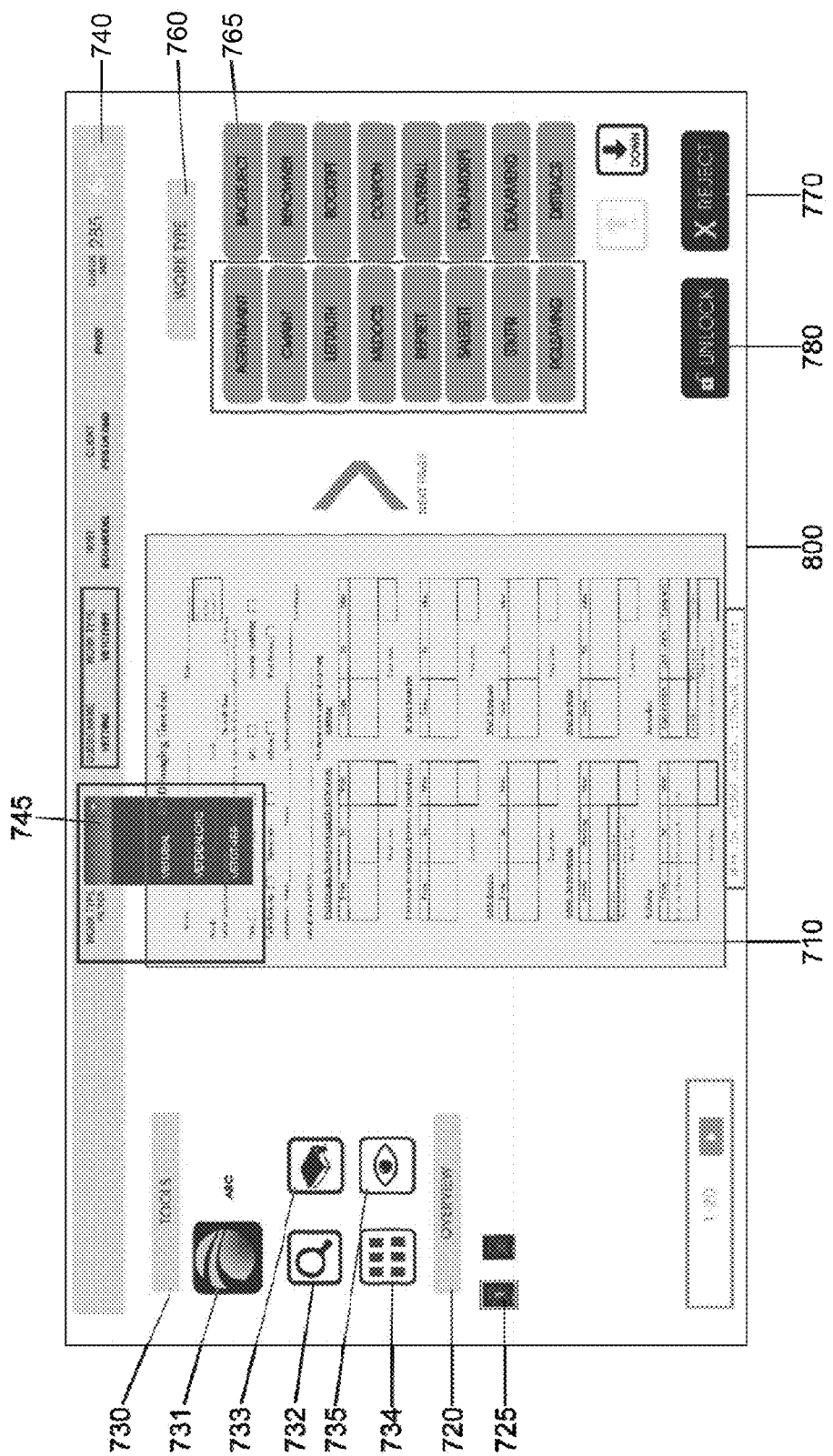
FIG. 8 is a screenshot of an alternative graphical user interface for data extraction and classification of an electronic document image in the system of FIG. 1, or other systems for contextualizing machine indeterminable information based on machine determinable information.

FIG. 8 is a screenshot of an alternative graphical user interface 800 for data extraction and classification of an electronic document image in the system of FIG. 1, or other systems for contextualizing machine indeterminable information based on machine determinable information. The interface 800 may include an electronic document image 710, a overview section 720, a tools section 730, an information section 740, a work type section 760, a reject selector 770, and an unlock selector 780. The overview section 720 may include one or more thumbnails 725 of electronic document images. The tools section 730 may include an entity identifier 731, a zoom selector 732, a business rules selector 733, a thumbnail navigation selector 734, and a quick view selector 735. The information section 740 includes a work type filter selector 745. The input fields section 750 includes one or more field selectors 755. The work type section 760, may include one or more work type selectors 765.

The interface 800 demonstrates a portrait orientation of the electronic document image 710. For example, the electronic document image 710 may be rotated by performing one or more touch gestures on the computing device 110 displaying the graphical user interface 800. For example, the operator may tap on the electronic document image 710 to rotate the electronic document image 710. The work type filter selector 745 demonstrates filters which may be applied to the work type selectors 765 by the operator. Alternatively or in addition, the image processing device 120 may apply one of the filters to the work type selectors 765 based on information extracted from the electronic document image 710.

Figure 9:
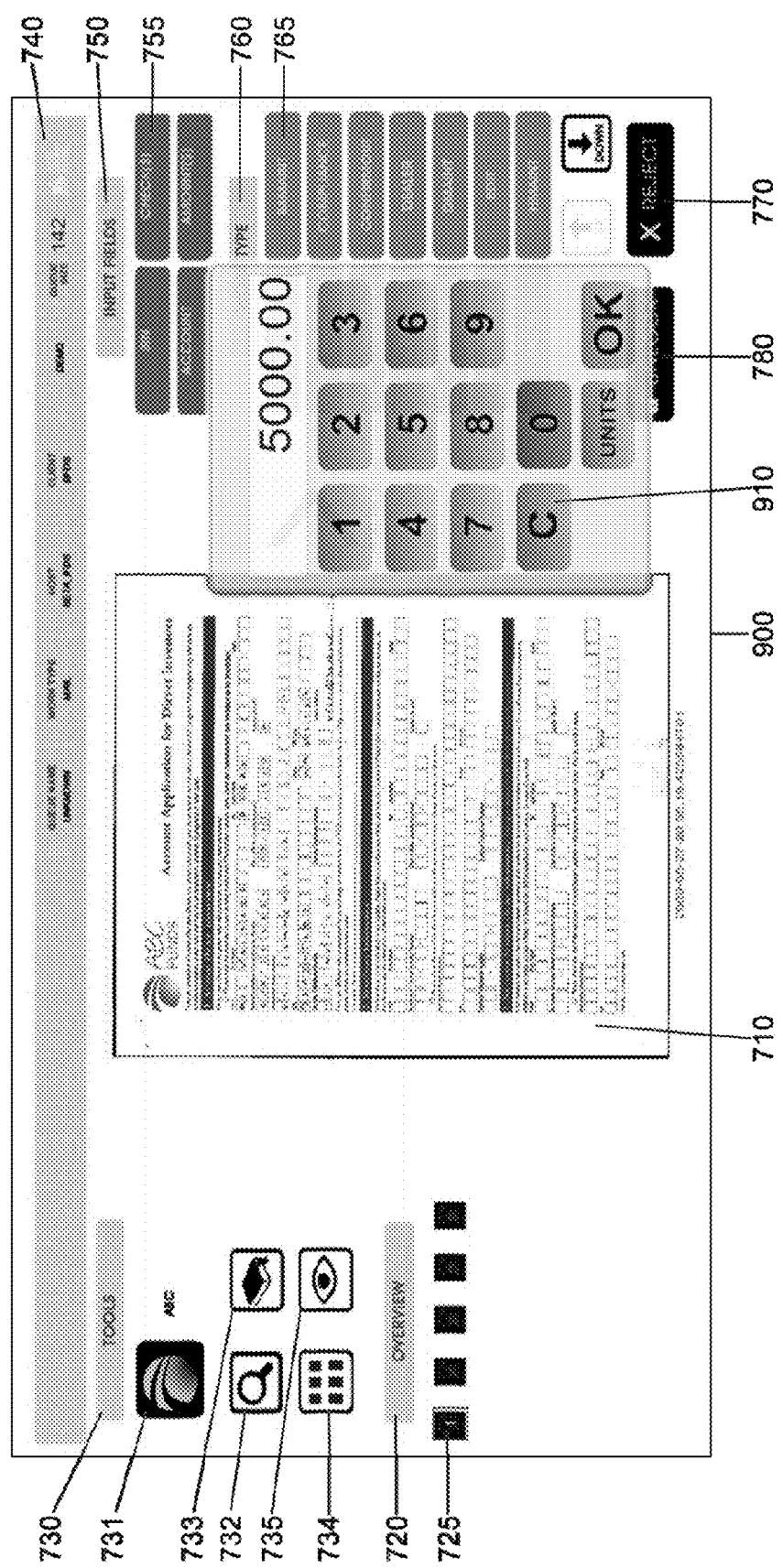
FIG. 9 is a screenshot of a graphical user interface for data extraction and classification of an electronic document image using a keypad representation in the system of FIG. 1, or other systems for contextualizing machine indeterminable information based on machine determinable information.

FIG. 9 is a screenshot of a graphical user interface 900 for data extraction and classification of an electronic document image using a data input keypad in the system of FIG. 1, or other systems for contextualizing machine indeterminable information based on machine determinable information. The interface 900 may include an electronic document image 710, an overview section 720, a tools section 730, an information section 740, a work type section 760, a reject button 770, an unlock button 780, and a keypad representation 910. The overview section 720 may include one or more thumbnails 725 of electronic document images. The tools section 730 may include an entity identifier 731, a zoom selector 732, a knowledge base selector 733, a thumbnail navigation selector 734, and a quick view selector 735. The input fields section 750 includes one or more field selectors 755. The work type section 760, may include one or more work type selectors 765.

In operation, the keypad representation 910 may be displayed to the operator when the operator selects, or touches, one of the input fields 755 associated with numerical information. For example, if the operator selects the AMOUNT($) input field selector 755, the keypad representation 910 may be displayed to the operator. The operator may use the keypad representation 910 to identify the value of the region of the electronic document image 710 corresponding to the input field selector 755. Alternatively or in addition, if the operator selects an input field selector 755 associated with an alphanumeric value, such as a "NAME" input field, the graphical user interface may display an alphanumeric keyboard representation to the operator.

Alternatively or in addition, the image processing device 120 may determine information from the electronic document image 710 associated with one or more of the data fields represented by the input field selectors 755. The graphical user interface may display the information extracted by the image processing device in an editable field of the keypad representation 910. The operator may modify the information or may confirm the information extracted is accurate. The image processing device 120 may modify a graphical attribute of the information to reflect a confidence value, or likelihood value, of the extracted information being accurate. OCR algorithms or IWR algorithms may extract information with a certain level of confidence. The level of confidence may represent the likelihood that the extracted information accurately represents the pixels it was extracted from. For example, information extracted with a high level of confidence may be displayed with a high brightness, while information extracted with a low level of confidence may be displayed with a low level of confidence. Alternatively or in addition, information extracted with a high level of confidence may be displayed in green, information extracted with an average level of confidence may be displayed in yellow, and information extracted with a low level of confidence may be displayed in red. The graphical attributes may be modified individually for each character of the information.

Figure 10:
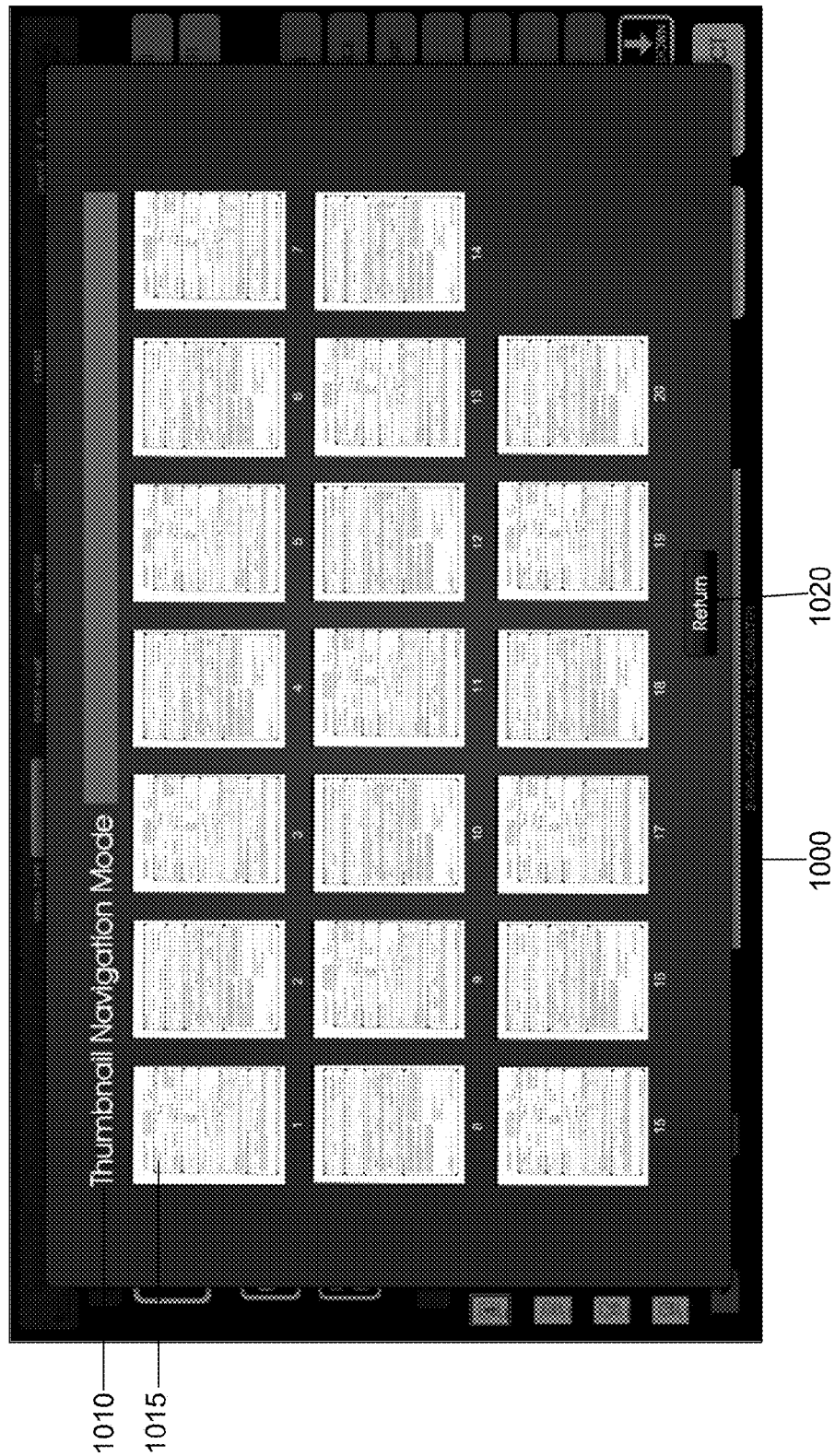
FIG. 10 is a screenshot of a graphical user interface for thumbnail navigation of electronic document images in the system of FIG. 1, or other systems for contextualizing machine indeterminable information based on machine determinable information.

FIG. 10 is a screenshot of a graphical user interface 1000 for thumbnail navigation of electronic document images in the system of FIG. 1, or other systems for contextualizing machine indeterminable information based on machine determinable information. The user interface 1000 includes a thumbnail navigation section 1010, thumbnails 1015 and a return selector 1020.

In operation, the user interface 1010 may be displayed to an operator when the operator selects the thumbnail navigation selector 734 of FIGS. 7-9. In operation, an operator may select one of the thumbnails 1015 to view/modify the electronic document image represented by the thumbnail, such as shown in FIGS. 7-9. The operator may select the return selector 1020 to return to the previous graphical user interface, such as the graphical user interface from which the thumbnail navigation selector 734 was selected.

Figure 11:
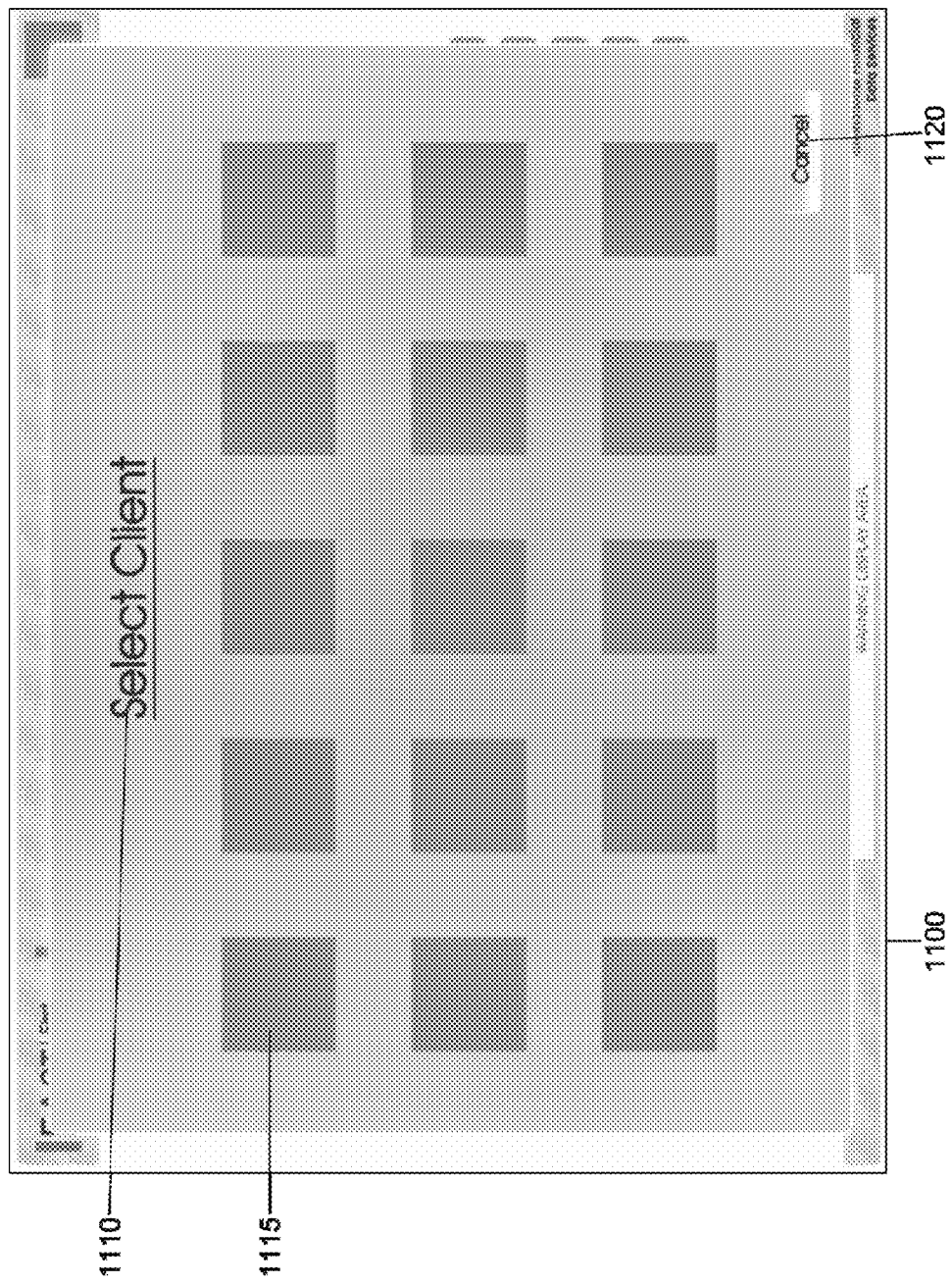
FIG. 11 is a screenshot of a graphical user interface for entity classification of a document in the system of FIG. 1, or other systems for contextualizing machine indeterminable information based on machine determinable information.

FIG. 11 is a screenshot of a graphical user interface 1100 for entity classification of a document in the system of FIG. 1, or other systems for contextualizing machine indeterminable information based on machine determinable information. The user interface 1100 may include a client subsection 1110, one or more client selectors 1115, and a cancel selector 1120. In operation, the interface 1100 may be displayed to an operator when the operator selects the entity identifier 731 in FIGS. 7-9. The image processing device 120 may determine an entity associated with the electronic document image 710 and may pre-select the entity identifier 731. However, if the operator determines the entity identifier 731 was incorrectly identified by the image processing device 120, the operator may select the entity identifier, such as by touching or clicking on the entity identifier 731. The selection of the entity identifier 731 causes the interface 1100 to be displayed to the operator. The interface 1100 may display identifiers of entities, such as logos, as the client selectors 1115. The operator may select the entity selector 1115 representing the entity which should be associated with the electronic document image 710. Upon selecting one of the entity selectors, the operator may be returned to the interface where the entity identifier 731 was selected, such as the interfaces shown in FIGS. 7-9. Alternatively or in addition, the operator may return to the interface where the entity identifier 731 was selected without selecting an entity selector 1115, by selecting the cancel selector 1120.

Figure 12:
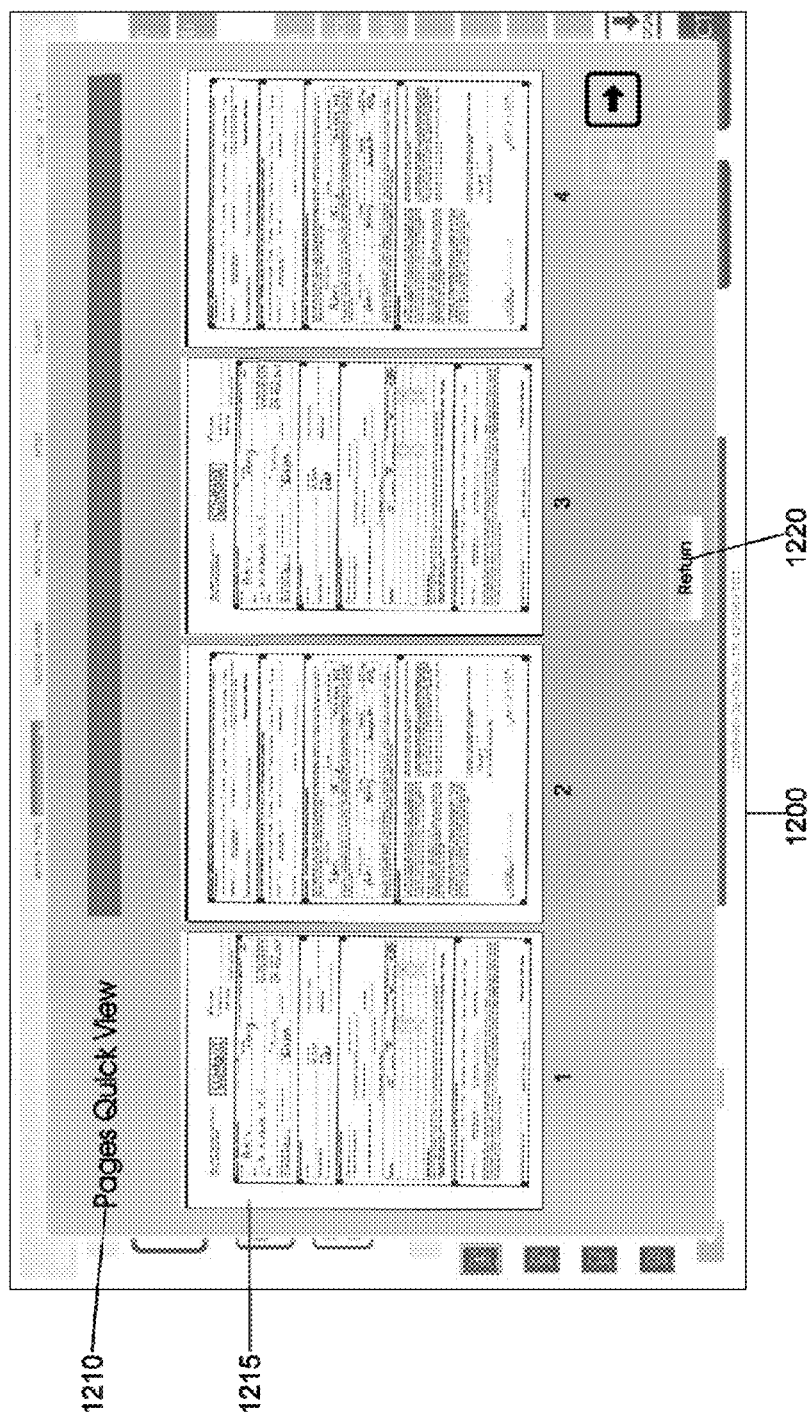
FIG. 12 is a screenshot of a graphical user interface for quick view of electronic document images in the system of FIG. 1, or other systems for contextualizing machine indeterminable information based on machine determinable information.

FIG. 12 is a screenshot of a graphical user interface 1200 for quick view of electronic document images in the system of FIG. 1, or other systems for contextualizing machine indeterminable information based on machine determinable information. The user interface 1200 may be displayed to the operator when the operator selects the quick view selector 735 shown in FIGS. 7-9 below. The interface 1200 may include a quick view section 1210, quick view images 1215, and a return selector 1220.

In operation, the operator may use the quick view section 1210 to view quick view images 1215 representing electronic document images. The quick view section 1210 may provide the operator with multiple quick view images 1215 simultaneously. The user interface 1200 for quick view may differ from the user interface 1000 for thumbnail navigation in that the user interface 1200 may display the quick view images 1215 in a larger scale than the thumbnails 1015. The quick view images 1215 may be displayed such that the operator can view and understand the information contained on each of the electronic document images represented by the quick view images 1215. The operator may select one of the quick view images 1215 to view/modify the electronic document image represented by the quick view image, such as in the interfaces shown in FIGS. 7-9. The operator may return to the previously viewed user interface by selecting the return selector 1220.

Figure 13:
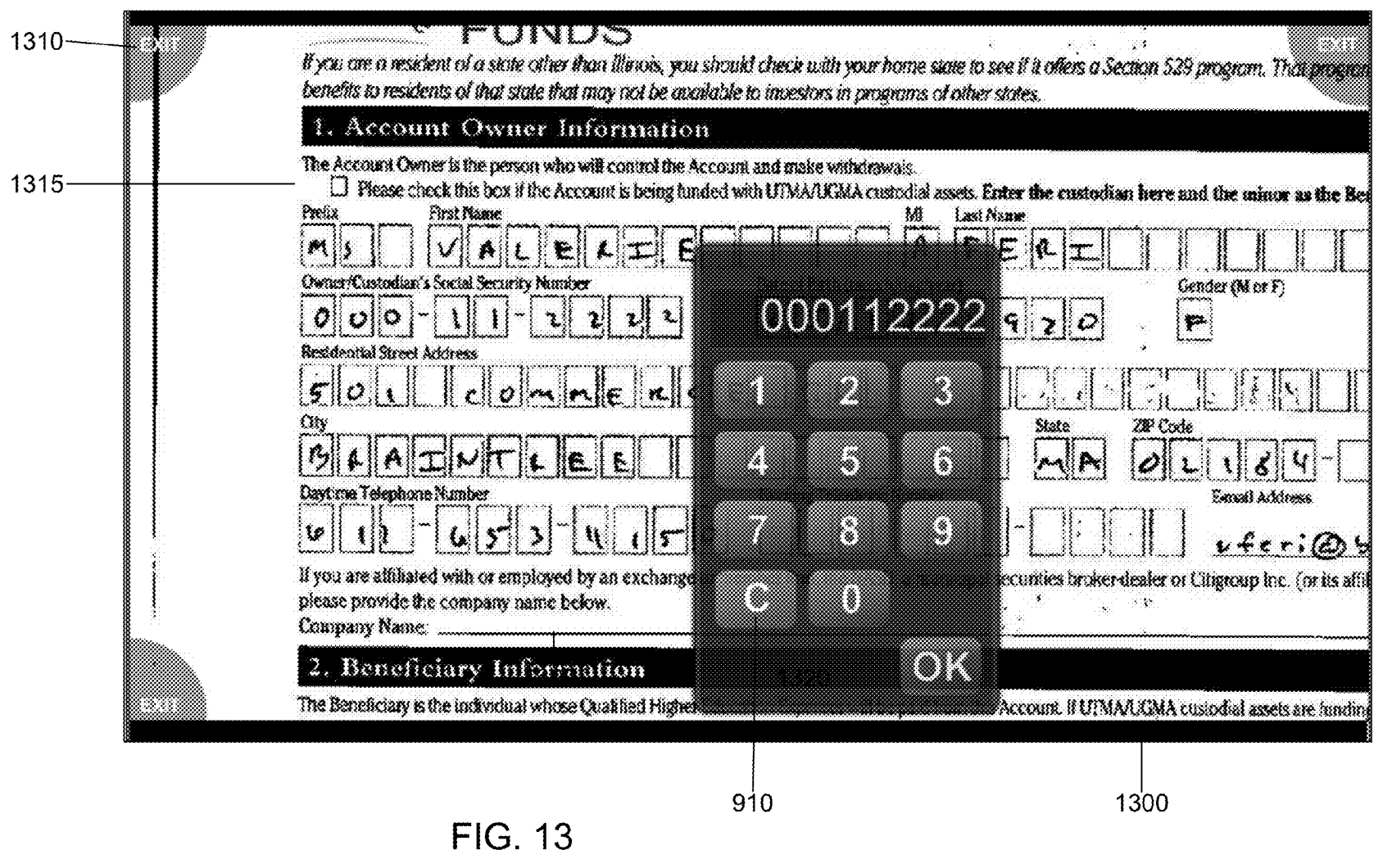

FIG. 13 is a screenshot of a graphical user interface 1300 for scale modified manipulation of an electronic document image for data extraction in the system of FIG. 1, or other systems for contextualizing machine indeterminable information based on machine determinable information. The user interface 1300 may include an exit selector 1310, a scaled modified electronic document image 1315 and a keypad representation 910. For example, the operator may be provided with the user interface 1300 upon selecting the zoom selector 732 as shown in FIGS. 7-9.

In operation, the operator may use the user interface 1300 to view a higher magnification of the electronic document image 710. For example, the operator may be unable to identify information on the electronic document image 710 at the standard magnification. The operator may identify the information using the keypad representation 910. The identified information is communicated by the computing device 110 to the image processing device 120 and stored in the data store 140. The operator may return to the previous user interface by selecting the exit selector 1310.

Figure 14:
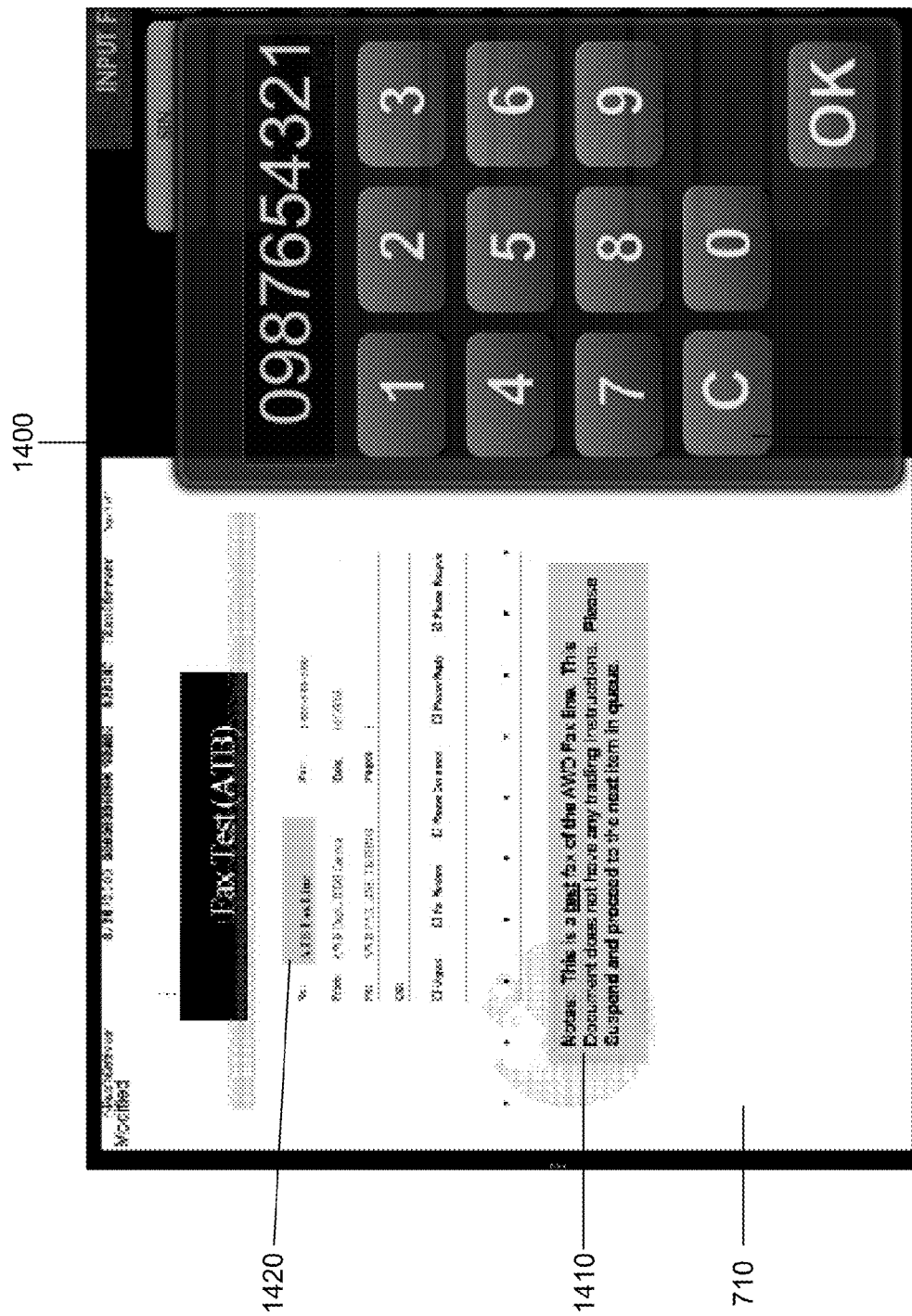
FIG. 14 is a screenshot of a graphical user interface for identifying regions of an electronic document image for association with a document type in the system of FIG. 1, or other systems for contextualizing machine indeterminable information based on machine determinable information.

FIG. 14 is a screenshot of a graphical user interface 1400 for identifying regions of an electronic document image for association with a document type in the system of FIG. 1, or other systems for contextualizing machine indeterminable information based on machine determinable information. The interface 1400 may include an electronic document image 710, selected regions 1410, 1420, and a keypad representation 910.

In operation, the operator may use the interface 1400 to identify one or more selected regions 1410, 1420 where information may be present and should be extracted. The image processing device 120 may receive a description of the relative locations of the selected regions 1410, 1420 from the computing device 110. The image processing device 120 may store the relative locations of the selected regions 1410, 1420 in the data store 140 as part of metadata associated with the document type of the electronic document image 710. The operator may also identify the information contained within each selected region using the keypad representation 910. The identified information is communicated by the computing device 110 to the image processing device 120 and stored in the data store 140.

Figure 15:
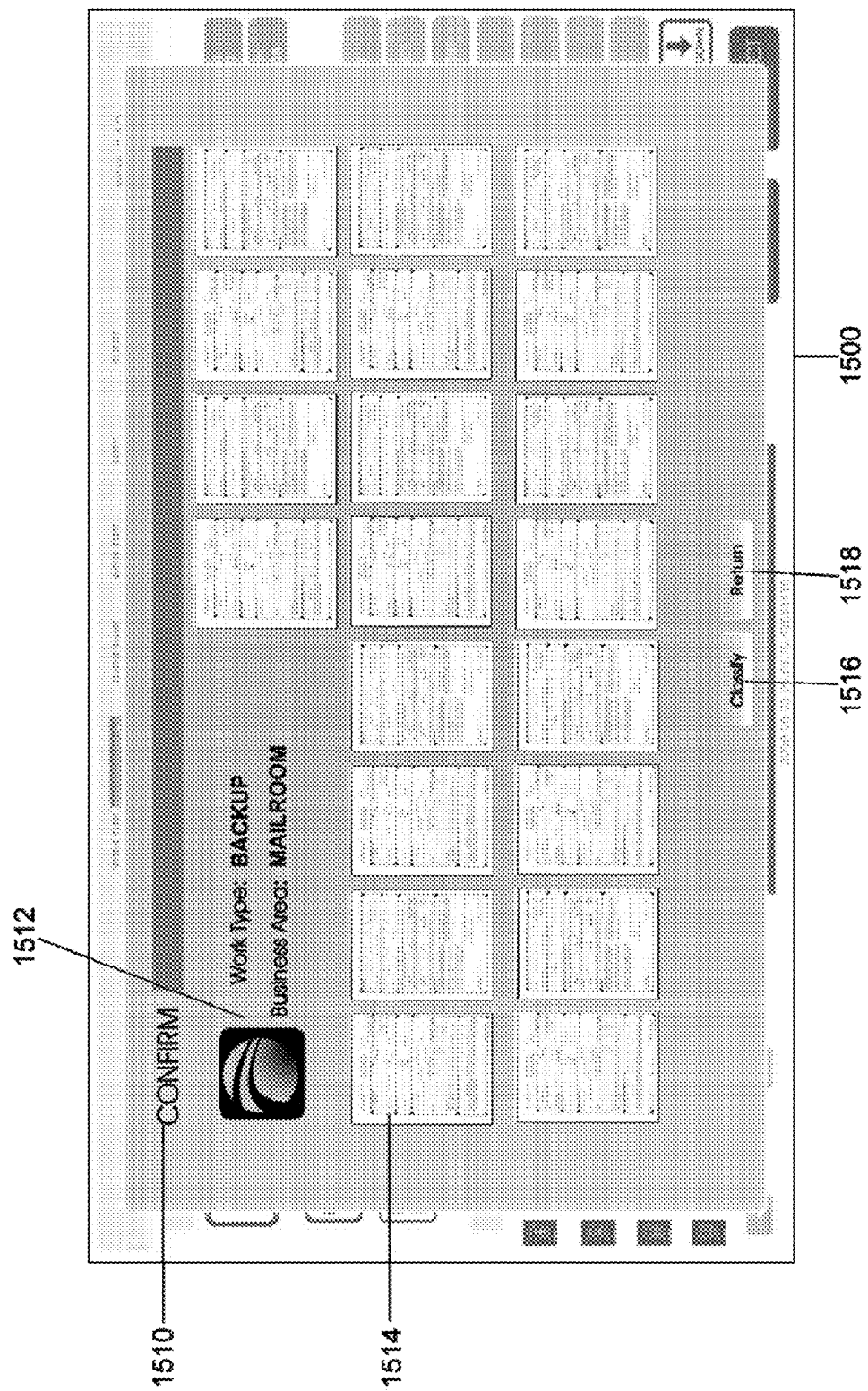
FIG. 15 is a screenshot of a graphical user interface for confirming classification of a set of electronic document images in the system of FIG. 1, or other systems for contextualizing machine indeterminable information based on machine determinable information.

FIG. 15 is a screenshot of a graphical user interface 1500 for confirming classification of a set of electronic document images in the system of FIG. 1, or other systems for contextualizing machine indeterminable information based on machine determinable information. The user interface 1500 may include a confirm section 1510, classification details 1512, and thumbnails 1514 of electronic document images, a classify selector 1516 and a return selector 1518. The user interface 1500 may allow the operator to perform a batch, or bulk, classification of the electronic document images represented by the thumbnails 1514.

In operation, the operator may identify one or more electronic document images which are associated with the same entity and document type. The confirm section 1510 may display the thumbnails 1514 of the electronic document image selected by the operator. The classification details 1512 may display the entity identifier and work type, or document type, the electronic document images will be classified as. Alternatively or in addition, the operator may further classify one or more electronic document images based on other characteristics of the electronic document images, such as the business area the electronic document images relate to. The classification details 1512 may also display any other classification characteristics identified for the electronic document images. The operator may confirm the classification of the electronic document images represented by the thumbnails 1514 to the classification identified by the classification details 1512, by selecting the classify selector 1516. The operator may return to the previous user interface, without classifying the electronic document images by selecting the return selector 1518.

Figure 16:
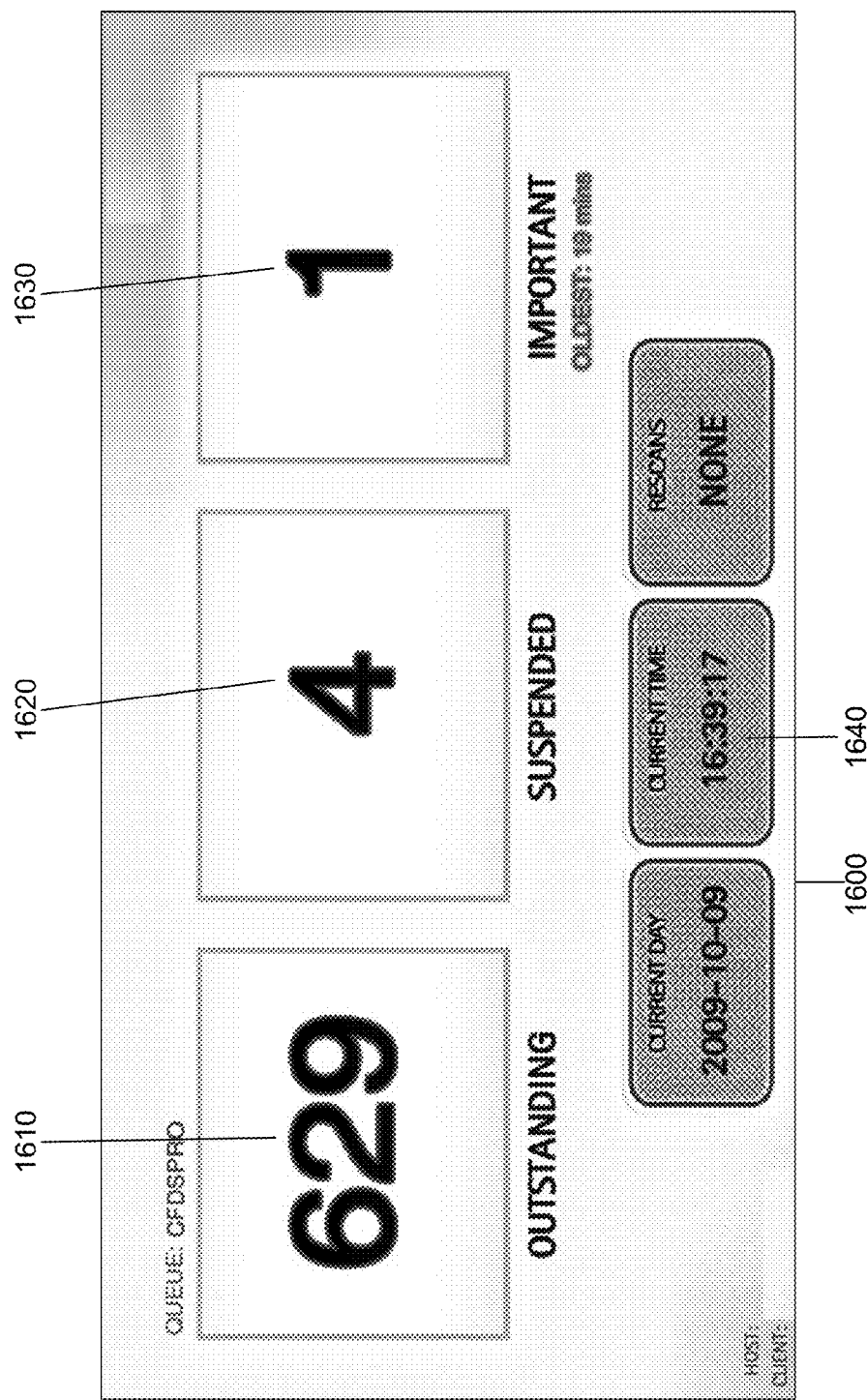
FIG. 16 is a screenshot of a graphical user interface for viewing status information in the system of FIG. 1, or other systems for contextualizing machine indeterminable information based on machine determinable information.

FIG. 16 is a screenshot of a graphical user interface 1600 for viewing status information in the system of FIG. 1, or other systems for contextualizing machine indeterminable information based on machine determinable information. The interface 1600 may include an outstanding section 1610, a suspended section 1620, an important section 1630, and an information section 1640. The interface 1600 may display the status of a queue being handled by an operator. The interface 1600 may be provided to the operator, or the interface 1600 may be provided to a supervisor who manages one or more operators.

In operation, the interface 1600 may display the number of outstanding electronic document images to be classified in the outstanding section 1610. The interface 1600 may display the number of electronic document images that were suspended in the suspended section 1620, and the display may display the number of electronic document images which were given an important, or high, priority, in the important section 1630. The interface 1600 may display general information in the information section 1640, such as the current date, the current time and information pertaining to electronic document images which were rescanned.

Figure 17:
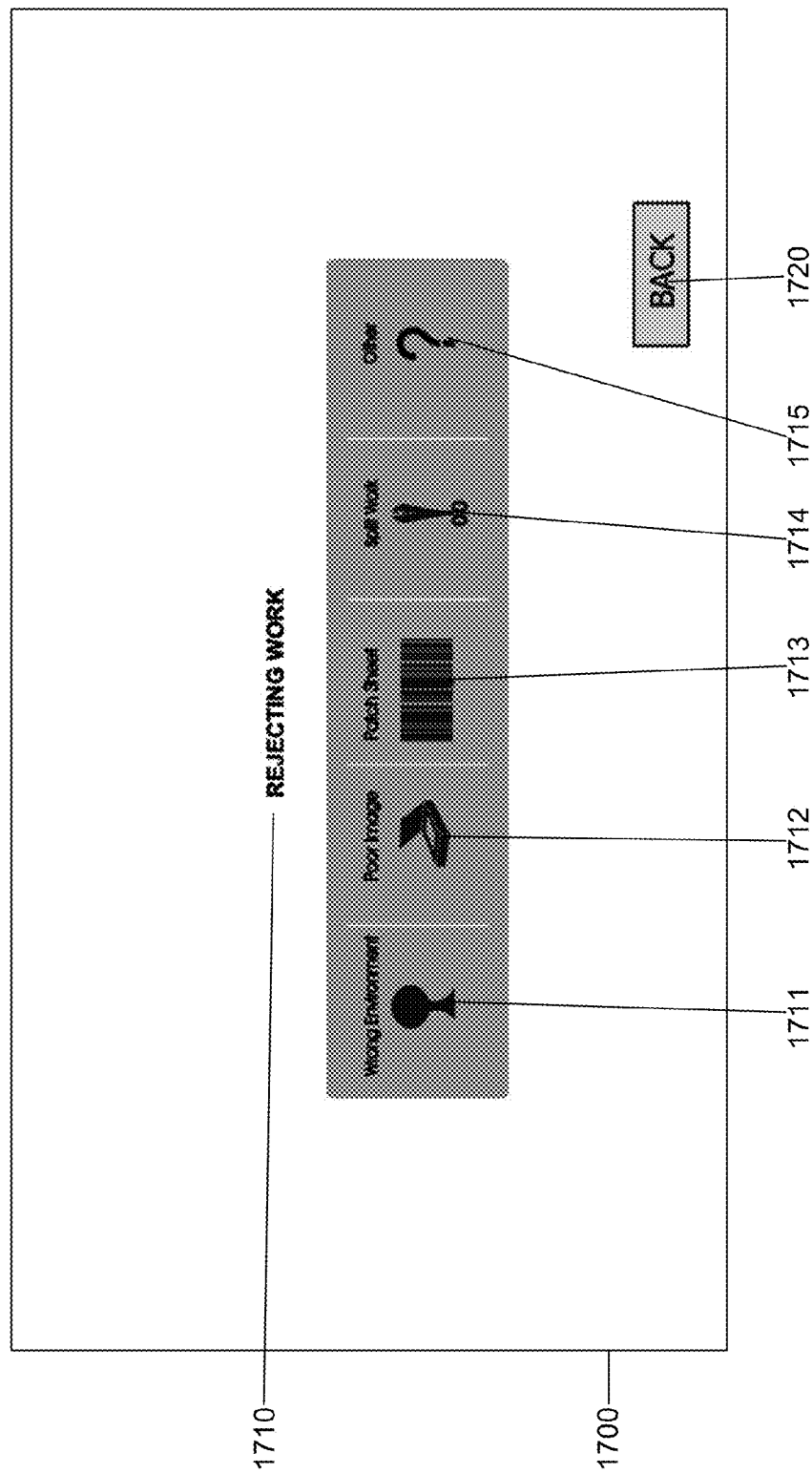
FIG. 17 is a screenshot of a graphical user interface for rejecting electronic document images in the system of FIG. 1, or other systems for contextualizing machine indeterminable information based on machine determinable information.

FIG. 17 is a screenshot of a graphical user interface 1700 for rejecting electronic document images in the system of FIG. 1, or other systems for contextualizing machine indeterminable information based on machine determinable information. The interface 1700 may include a work rejection section 1710 and a back button 1720. The work rejection section may include a wrong environment selector, a poor image selector 1712, a patch sheet selector 1713, a split work selector 1714, and an other selector 1715. The interface 1700 may be provided to an operator when the operator selects the reject selector 770, as shown in FIGS. 7-9.

In operation, the operator may select the selector 1711, 1712, 1713, 1714, 1715 which indicates the reason why the electronic document image is being rejected. The operator may select the wrong environment selector 1711 if the electronic document image is not part of the environment the operator is associated with. For example, the login of each operator may be associated with an environment which may include one or more entities and document types. Each environment may be associated with different entities and/or different document types such that. Thus, if a given electronic document image is associated with an entity that is not part of the environment associated with the operator, the electronic document image can be rejected by selecting the wrong environment selector 1711.

The operator may select the poor image selector 1712 if the image quality of the electronic document image is not acceptable. The operator may select the patch sheet selector 1713 to indicate that the electronic document image represents a patch sheet and should not be classified. Patch sheets may be used to indicate a separation of documents belonging to different entities, or separation of groups of documents. The operator may select the split work selector 1714 to indicate that the electronic document image should be split from a group of electronic document images, such as a group identified by a patch sheet. The operator may select the other selector 1715 to identify any other reason for rejecting an electronic document image. Alternatively or in addition, the operator may select the back selector 1720 to return to the previous user interface without rejecting the electronic document image.

Figure 18:
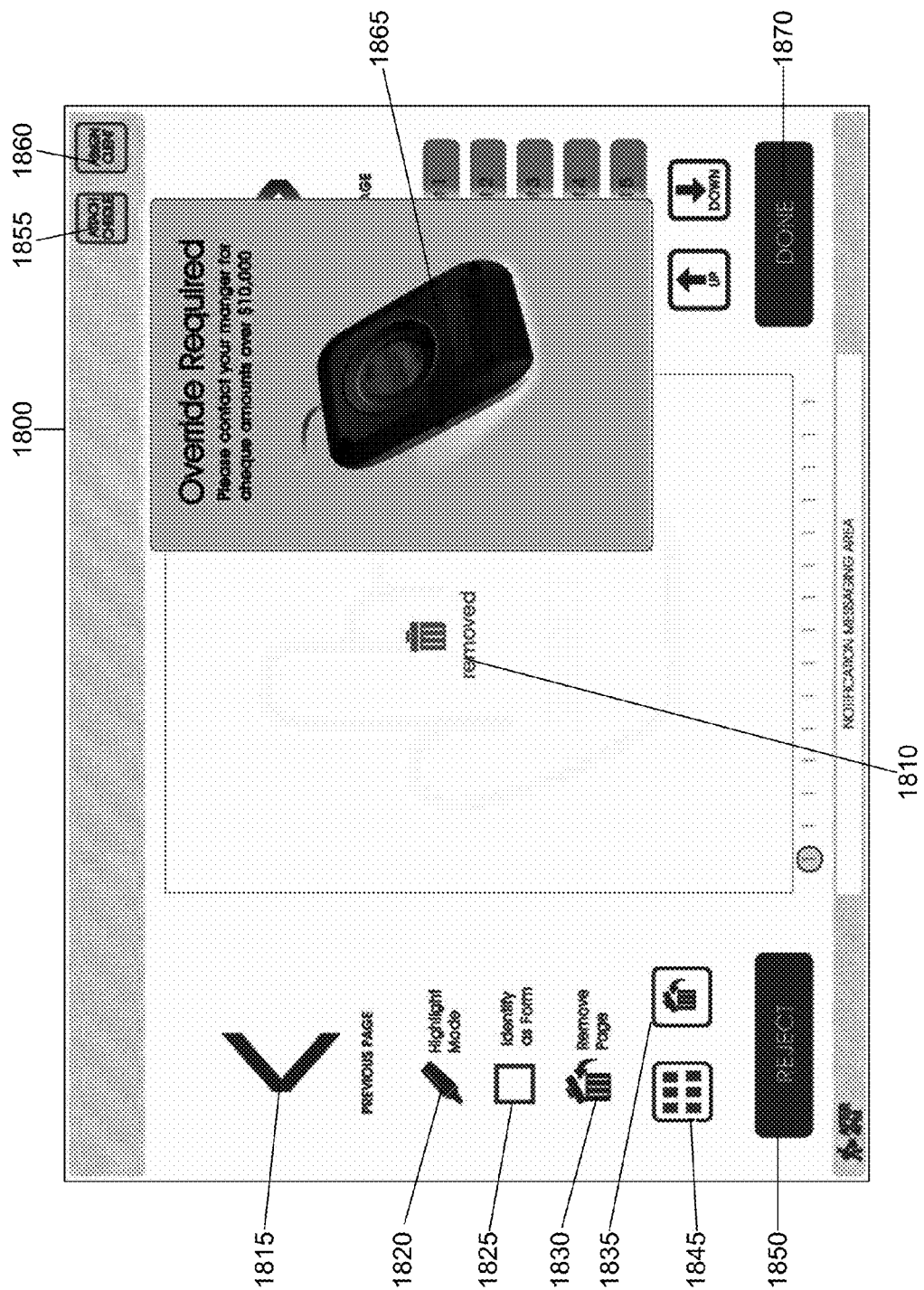
FIG. 18 is a screenshot of a graphical user interface for supervisor authentication in the system of FIG. 1, or other systems for contextualizing machine indeterminable information based on machine determinable information.

FIG. 18 is a screenshot of a graphical user interface 1800 for supervisor authentication in the system of FIG. 1, or other systems for contextualizing machine indeterminable information based on machine determinable information. The interface 1800 includes an electronic document image section 1810, a previous page selector 1815, a highlight mode selector 1820, an identify as form selector 1825, a remove page selector 1830, an alternative remove page selector 1835, a thumbnail navigation selector 1845, a reject selector 1850, a attach check selector 1855, an assign client selector 1860, an authorization display 1865, and a done button 1870.

In operation, the operator may use the interface 1800 to view an electronic document image displayed in the electronic document image section 1810. The operator may activate the highlight mode by selecting the highlight mode selector 1820. In the highlight mode, the operator may select one or more regions of an electronic document image where information should be extracted, as shown in FIG. 14. A description of the identified regions is communicated to the image processing device 120 and stored in the data store 140 as metadata associated with the document type corresponding to the electronic document image. The operator may identify the electronic document image displayed in the electronic document image section as a form by selecting the identify as form selector 1825. Identifying the electronic document image as a form allows the operator to identify information located within regions of the form to be stored in the data store 140. The operator may remove the electronic document image by selecting the remove page selector 1830, or the alternative remove page selector 1835. The operator may view the thumbnail navigation interface, as shown in FIG. 10, by selecting the thumbnail navigation selector 1845. The operator may reject the electronic document image by selecting the reject selector 1850. The operator may associate the electronic document image with a second electronic document image, such as an electronic document image representing a check, by selecting the attach check selector 1855. The operator may identify the entity associated with the electronic document image by selecting the assign client selector 1860. The operator may complete the classification of the electronic document image by selecting the done selector 1870.

One or more functions provided by the interface 1800 may require authorization of a manager or supervisor. For example, the authorization display 1865 in the interface 1800 indicates that manager authorization is required for entering check values greater than $10,000. The operator may be unable to perform the function without authorization of a manager/supervisor, such as login/password authentication, biometric authentication, or generally any authentication capable of authenticating a manager/supervisor.

Figure 19:
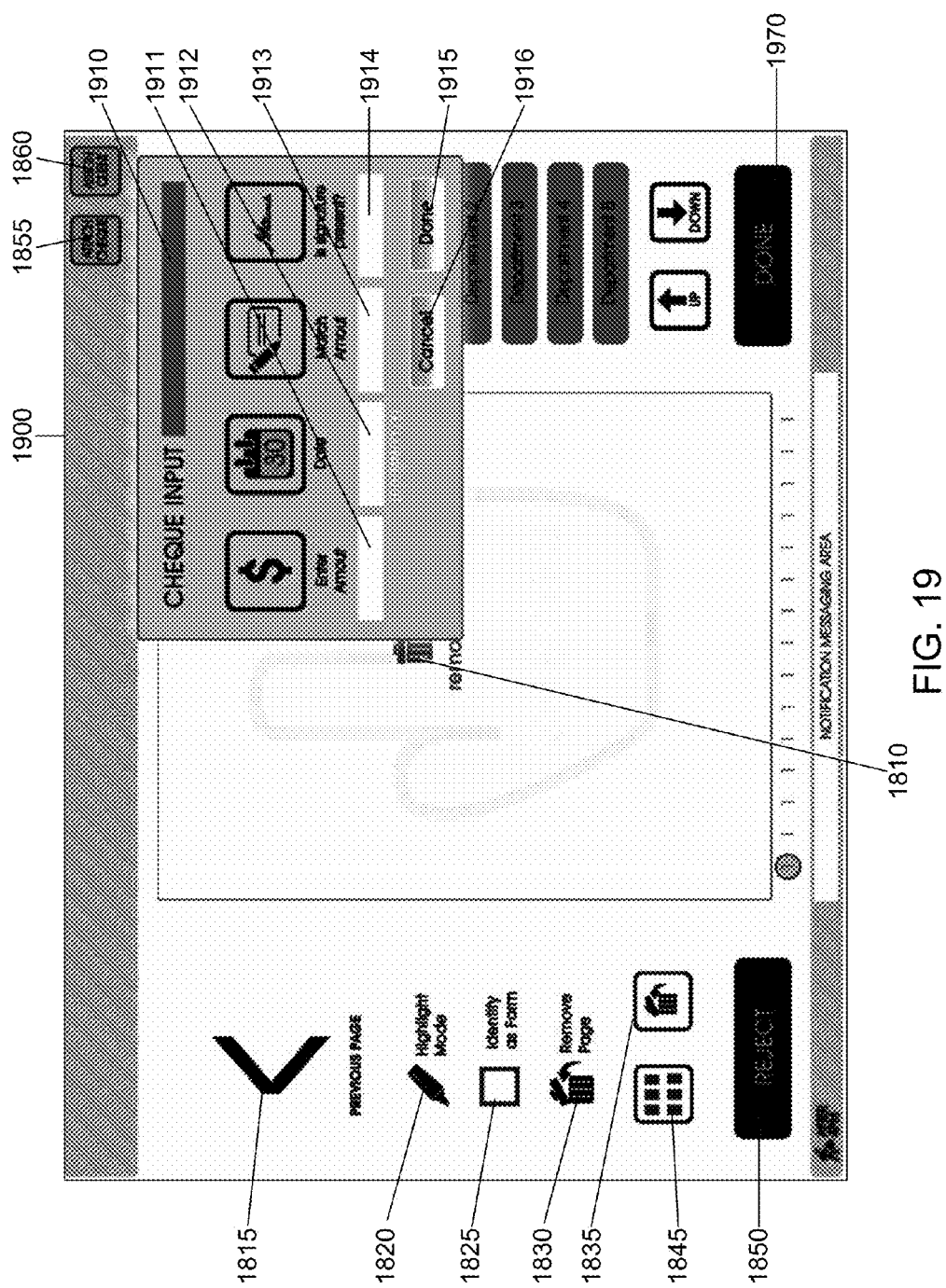
FIG. 19 is a screenshot of a graphical user interface for extracting data from a check in the system of FIG. 1, or other systems for contextualizing machine indeterminable information based on machine determinable information.

FIG. 19 is a screenshot of a graphical user interface 1900 for extracting data from a check in the system of FIG. 1, or other systems for contextualizing machine indeterminable information based on machine determinable information. The interface 1900 includes an electronic document image section 1810, a previous page selector 1815, a highlight mode selector 1820, an identify as form selector 1825, a remove page selector 1830, an alternative remove page selector 1835, a thumbnail navigation selector 1845, a reject selector 1850, a attach check selector 1855, an assign client selector 1860, an authorization display 1865, a done button 1870, an input section 1910, an amount field 1911, a date field 1912, a match amount field 1913, a signature present field 1914, a cancel selector 1916, and a done selector 1915.

In operation, the image processing device 120 may provide the interface 1900 to an operator when the operator selects the attach check selector 1855 in FIG. 18. The operator may identify the amount of the check in the amount field 1911, the date of the check in the date field 1912, the match amount in the match amount field 1913, and whether a signature is present on the check in the signature present field 1914. The image processing device 120 may pre-populate one or more of the fields 1911, 1912, 1913, 1914 with information extracted from the check, if available. The operator may complete the attach check operation by selecting on the done selector 1915, or may cancel the attach check operation by selecting the cancel selector 1916. There may be one or more authorization rules, or criteria, associated with the attach check operation. For example, if the amount identified in the amount field 1911 exceeds a threshold, the image processing device 120 may require authorization of a manager/supervisor in order to complete the operation, as shown in FIG. 18. Alternatively, or in addition, there may be other rules/criteria associated with the information extracted from the check, the electronic document image to which the check is being attached and/or the entity associated with the electronic document image.

Figure 20:
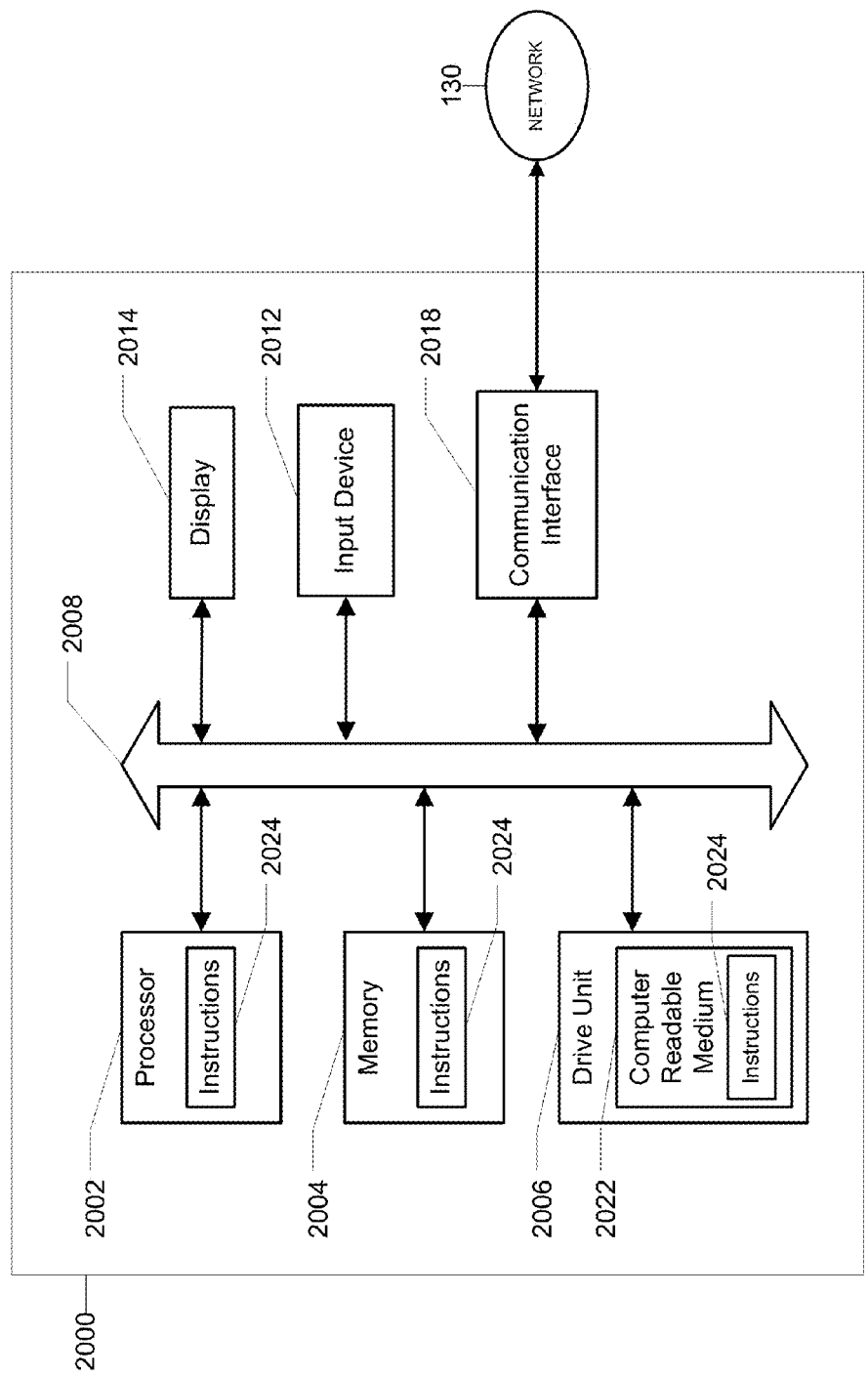
FIG. 20 is an illustration of a general computer system that may be used in the systems of FIG. 1, or other systems for contextualizing machine indeterminable information based on machine determinable information.

FIG. 20 illustrates a general computer system 2000, which may represent the image processing device 120, the computing device 110, or any of the other computing devices referenced herein. The computer system 2000 may include a set of instructions 2024 that may be executed to cause the computer system 2000 to perform any one or more of the methods or computer based functions disclosed herein. The computer system 2000 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 2000 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 2024 (sequential or otherwise) that specify actions to be taken by that machine. In a particular embodiment, the computer system 2000 may be implemented using electronic devices that provide voice, video or data communication. Further, while a single computer system 2000 may be illustrated, the term "system" shall also be taken to include any collection of systems or subsystems that individually or jointly execute a set, or multiple sets, of instructions to perform one or more computer functions.

As illustrated in FIG. 20, the computer system 2000 may include a processor 2002, such as, a central processing unit (CPU), a graphics processing unit (GPU), or both. The processor 2002 may be a component in a variety of systems. For example, the processor 2002 may be part of a standard personal computer or a workstation. The processor 2002 may be one or more general processors, digital signal processors, application specific integrated circuits, field programmable gate arrays, servers, networks, digital circuits, analog circuits, combinations thereof, or other now known or later developed devices for analyzing and processing data. The processor 2002 may implement a software program, such as code generated manually (i.e., programmed).

The computer system 2000 may include a memory 2004 that can communicate via a bus 2008. The memory 2004 may be a main memory, a static memory, or a dynamic memory. The memory 2004 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 2004 may include a cache or random access memory for the processor 2002. Alternatively or in addition, the memory 2004 may be separate from the processor 2002, such as a cache memory of a processor, the system memory, or other memory. The memory 2004 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 2004 may be operable to store instructions 2024 executable by the processor 2002. The functions, acts or tasks illustrated in the figures or described herein may be performed by the programmed processor 2002 executing the instructions 2024 stored in the memory 2004. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 2000 may further include a display 2014, such as a liquid crystal display (LCD), an organic light emitting diode (OLED), a flat panel display, a solid state display, a cathode ray tube (CRT), a projector, a printer or other now known or later developed display device for outputting determined information. The display 2014 may act as an interface for the user to see the functioning of the processor 2002, or specifically as an interface with the software stored in the memory 2004 or in the drive unit 2006.

Additionally, the computer system 2000 may include an input device 2012 configured to allow a user to interact with any of the components of system 2000. The input device 2012 may be a number pad, a keyboard, or a cursor control device, such as a mouse, or a joystick, touch screen display, remote control or any other device operative to interact with the system 2000.

The computer system 2000 may also include a disk or optical drive unit 2006. The disk drive unit 2006 may include a computer-readable medium 2022 in which one or more sets of instructions 2024, e.g. software, can be embedded. Further, the instructions 2024 may perform one or more of the methods or logic as described herein. The instructions 2024 may reside completely, or at least partially, within the memory 2004 and/or within the processor 2002 during execution by the computer system 2000. The memory 2004 and the processor 2002 also may include computer-readable media as discussed above.

The present disclosure contemplates a computer-readable medium 2022 that includes instructions 2024 or receives and executes instructions 2024 responsive to a propagated signal; so that a device connected to a network 130 may communicate voice, video, audio, images or any other data over the network 130. Further, the instructions 2024 may be transmitted or received over the network 130 via a communication interface 2018. The communication interface 2018 may be a part of the processor 2002 or may be a separate component. The communication interface 2018 may be created in software or may be a physical connection in hardware. The communication interface 2018 may be configured to connect with a network 130, external media, the display 2014, or any other components in system 2000, or combinations thereof. The connection with the network 130 may be a physical connection, such as a wired Ethernet connection or may be established wirelessly as discussed below. Likewise, the additional connections with other components of the system 2000 may be physical connections or may be established wirelessly. In the case of a service provider server 240, the service provider server 240 may communicate with users 120A-N through the communication interface 2018.

The network 130 may include wired networks, wireless networks, or combinations thereof. The wireless network may be a cellular telephone network, an 802.11, 802.16, 802.20, or WiMax network. Further, the network 130 may be a public network, such as the Internet, a private network, such as an intranet, or combinations thereof, and may utilize a variety of networking protocols now available or later developed including, but not limited to TCP/IP based networking protocols.

The computer-readable medium 2022 may be a single medium, or the computer-readable medium 2022 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 2022 may include a solid-state memory such as a memory card or other package that houses one or more non-volatile read-only memories. The computer-readable medium 2022 also may be a random access memory or other volatile re-writable memory. Additionally, the computer-readable medium 2022 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method of processing electronic document images, the method comprising:
   receiving an electronic document image, the electronic document image comprising at least a portion of which may be determinable by a machine;
   contextualizing information related to a document type of the electronic document image based on machine determinable information of the electronic document image;
   presenting the contextualized information to a user to facilitate interpretation thereof and, in response thereto, receiving data representative of the document type of the electronic document image;
   retrieving, from a data store, metadata associated with the document type, wherein the metadata comprises a description of a plurality of regions of the electronic document image, an action criterion and a document handling action;
   deriving a plurality of data items from the plurality of regions of the electronic document image described by the metadata;
   determining, by a processor, whether the electronic document image satisfies the action criterion based on at least one of the plurality of data items; and
   initiating the document handing action when the electronic document image satisfies the action criterion.

2. The method of claim 1 wherein the action criterion comprises a validation criterion for validating the plurality of data item derived from the electronic document image.

3. The method of claim 2 further comprising providing a graphical user interface displaying the electronic document image when the electronic document image does not satisfy the validation criterion.

4. The method of claim 2 further comprising storing an indication that the electronic document image requires further review when the electronic document image does not satisfy the validation criterion.

5. The method of claim 1 wherein the metadata further describes a plurality of data fields of a data store, wherein each data field corresponds to one of the plurality of regions and further comprising:
   storing each respective data item of the plurality of data items in the data field of the plurality of data fields corresponding to the region of the plurality of regions from which the data item was derived.

6. The method of claim 1 wherein the document handling action comprises routing the electronic document image to a destination.

7. The method of claim 1 wherein the document handling action comprises generating an alert and communicating the alert, wherein the alert describes at least one of the plurality of data items.

8. The method of claim 1 wherein the document handling action comprises modifying a handling priority associated with the electronic document image.

9. The method of claim 1 wherein the action criterion is satisfied when at least one data item cannot be derived from at least one of the plurality of regions.

10. The method of claim 9 further comprising receiving, via a graphical user interface, the at least one data item which cannot be derived from the at least one of the plurality of regions.

11. The method of claim 1 wherein the action criterion is satisfied when at least one of the plurality of data items is indicative of a high cash transaction.

12. The method of claim 1 wherein the action criterion is satisfied when at least one of the plurality of data items is indicative of an identified entity of a plurality of entities being associated with the electronic document image.

13. The method of claim 1 further comprising receiving a plurality of entity identifiers from a user, wherein each entity identifier identifies an entity the user wishes to monitor and the action criterion is satisfied when at least one of the plurality of data items is indicative of at least one of the plurality of entity identifiers.

14. The method of claim 13 further wherein the document handling action comprises generating an alert and communicating the alert to the user, wherein the alert comprises the at least one of the plurality of entity identifiers.

* * * * *